United States Patent [19]

Abramovitch et al.

[11] Patent Number: 5,446,648

[45] Date of Patent: Aug. 29, 1995

[54] DETERMINATION OF OPEN LOOP RESPONSES FROM CLOSED LOOP MEASUREMENTS

[76] Inventors: Daniel Y. Abramovitch, 2470 Glendenning Ave., Santa Clara, Calif. 95050; Carl P. Taussig, 2295 Alameda, Redwood City, Calif. 94061

[21] Appl. No.: 843,665

[22] Filed: Feb. 28, 1992

[51] Int. Cl.6 ............... G05B 13/02; G06F 15/46
[52] U.S. Cl. .................. 364/148; 364/148; 364/160
[58] Field of Search ............... 364/148–150, 364/164, 165, 151–163; 318/561; 395/85, 97, 98

[56] References Cited

U.S. PATENT DOCUMENTS

| 4,879,643 | 11/1989 | Chakravarty et al. | 364/148 |
| 4,998,051 | 3/1991 | Ito | 364/165 |
| 5,144,549 | 9/1992 | Youcef-Toumi | 364/148 |

OTHER PUBLICATIONS

P. L. Lin & Y. C. Wu, "Identification of Multi-Input Multi-Output Linear System From Frequency Response Data", Trans. A.S.M.E., vol. 104 (1982) pp. 58–64.

E. S. Atkinson et al., "Low-Frequency Analyzer Combines Measurement Capability With Modeling & Analysis Tools", Hewlett-Packard Journal, Jan. 1987, pp. 4–16.

R. C. Blackman et al., "Measurement Modes & Digital Demodulation for a Low-Frequency Analyzer", Hewlett-Packard Journal, Jan. 1987, pp. 17–25.

J. L. Adock, "Analyzer Synthesizers Frequency Responses of Linear Systems", Hewlett-Packard Journal, Jan. 1987, pp. 25–32.

J. L. Adock, "Curve Fitter for Pole-Zero Analysis", Hewlett-Packard Journal, Jan. 1987, pp. 33–37.

(List continued on next page.)

Primary Examiner—Roy N. Envall, Jr.
Assistant Examiner—Thomas E. Brown

[57] ABSTRACT

Method and apparatus for determining open-loop parameters for each of three general feedback configurations from measurements of the closed-loop error signals or other output signals produced in response to provision of predetermined input signals for the configuration. The feedback loop in one embodiment includes a sum or difference module, a controller module, a plant module and a sensor dynamics module, arranged serially, where the actions of the controller module, the plant module and the sensor dynamics module are represented by associated matrices C, P and H, respectively, when operating in the linear region. The feedback loop in a second embodiment includes a first sum or difference module, a controller module, a second sum or difference module and a plant module, arranged serially, where the actions of the controller module and the plant module are represented by associated matrices C and P, respectively, when operating in the linear region. The feedback loop in a third embodiment includes a first sum or difference module, a controller module, a second sum or difference module, a plant module, a third sum or difference module, and a sensor dynamics module, arranged serially, where the controller module, the plant module and the sensor dynamics module are represented by associated matrices C, P and H, respectively, when operating in the linear region. The sum or difference modules in the second and third embodiments are used to introduce arbitrary input test signals into the loop. Each of the three embodiments or configurations is defined by a sequence of matrix equations that determine various linear combinations of intermediate and output signals in terms of the input test signals provided. These matrix equations are rewritten in terms of certain combined action matrices, and these combined action matrix equations are "unwrapped" and used to determine the open-loop parameters associated with the configuration.

48 Claims, 4 Drawing Sheets

OTHER PUBLICATIONS

R. L. Dailey et al., "MIMO Transfer Function Curve Fitting Using Chebyshev Polynomials", published by TRW Space & Technology Group, 1987; also presented at 35th Annual Meeting of the Society of Industrial and Applied Mathematics, Denver, Colo., Oct. 1987.

Hewlett-Packard Co. Application Note 243-2, "Control System Development Using Dynamic Signal Analyzers", 1984, pp. 1-64.

Hewlett-Packard Product Note HP3562A/3563A-1, "Measuring the Open-Loop Frequency Response of the Phase-Locked Loop", 1990, pp. 1-23.

E. C. Levy, "Complex-Curve Fitting", IRE Transactions on Automatic Control, May 1959, pp. 37-43.

M. D. Sidman et al., "Parametric System Identification on Logarithmic Frequency Response Data", IEEE Transactions on Automatic Control, vol. 36, No. 9, Sep. 1991, pp. 1065-1070.

DETERMINATION OF OPEN LOOP RESPONSES FROM CLOSED LOOP MEASUREMENTS

FIELD OF THE INVENTION

This invention relates to measurement and analysis of frequency responses of multiple input and/or multiple output dynamic systems, including those under feedback control.

BACKGROUND OF THE INVENTION

In order to design a compensator for a dynamic system, it is necessary to have an effective model for the system. A common approach to modelling a system is in the frequency domain, using Fourier, Laplace or Z transforms. Non-parametric identification is commonly used to obtain an estimate of the frequency response function of a dynamic system. Mathematical models may then be fit to the frequency response function to obtain an analytic model of the dynamic system that generates approximately the same frequency response. This analytic model is often referred to as a transfer function. Strictly speaking, transfer functions refer to the analytic models in the frequency domain of the control system, and frequency response functions refer to a vector of responses of a given control system for a given vector of individual frequencies. The equations in this disclosure are valid for either case. For convenience here, these will all be referred to as transfer functions. Currently, the technology is quite mature for single-input, single-output ("SISO") systems, an example of which is illustrated in FIG. 1. Measurements and curve fits can be made of both analog and digital open-loop and closed-loop systems.

Control design is usually done on an open-loop measurement or model of the physical system of interest. However, many physical systems cannot be measured unless a feedback loop is wrapped around them. This control loop uses some nominal compensator that need only perform well enough to produce a good measurement. From this measurement, an improved model of the physical system is obtained, which allows a better compensator to be designed. This process can be, and often is, iterated until a final compensator is designed.

For single input, single output ("SISO") systems, instruments currently exist that allow one to make a measurement of a closed-loop system and to "unwrap" the closed-loop frequency response function to produce an open-loop frequency response function. The compensator frequency response function, represented by the module C in FIG. 1, is usually easy to compute or measure open-loop, and this function can then be factored out to produce the physical system frequency response function, represented by the module P in FIG. 1. For multi-input, multi-output ("MIMO") systems, closed-loop measurements can be made by procedures analogous to the procedures used for SISO systems. However, no approach has been available for extracting the open-loop frequency response function for the physical system.

In the time-invariant SISO system shown in FIG. 1, a scalar input signal r(t), or its frequency domain representative signal R(f), is received on an input signal line 13 at a first terminal of a difference-forming module 15. The difference module 15 receives a second input signal Y(f) at a second terminal on a second input signal line 17. A difference signal or error signal $E(f) = R(f) - Y(f)$ issues from the difference module 15 on a first intermediate signal line 19, and this signal E(f) is received by a compensator module or signal processor 21. The compensator module 21 issues an intermediate signal U(f) that is received on an intermediate signal line 23 by a physical system or plant module 25 that is being controlled. The plant 25 issues on output signal Y(f) on an output signal line 27 that is also received at the second input terminal of the difference module 15.

Although it is sometimes possible to make measurements of an open-loop system, for example, by use of the signal lines 23 and 27 associated with the physical system or plant module 25 in FIG. 1, it is often difficult to keep the system within its linear operating range without the use of a feedback controller. In a SISO system that has a limited range over which it is linear, it is fairly common to perform measurements of closed-loop systems and then unwrap or open the loop. In FIG. 1, the compensator module 21 and plant module 25 may present either the transfer functions or frequency response functions of these modules. The feedback loop signals may be presented either in continuous-time or in discrete-time. In the continuous-time case, the transfer functions for the modules 21 and 25 are functions of continuous frequency s, and in the discrete-time case, they are functions of discrete frequency z. In either case, the frequency response functions are functions of $\omega = 2\pi f$ or $j\omega (j = \sqrt{-1})$. In continuous time $s = j\omega$; in discrete time, $z = \exp(j\omega T)$, where T is the sample period. For discrete-time systems, the measurement is usually limited to a frequency span $0 \leq f < (2T)^{-1}$, referred to as a Nyquist band.

When making closed-loop measurements are made on a SISO system with an input signal R(f) and output signal Y(f), the ratio between the input signal and the output signal at a given frequency $f_0$ can be represented by the relation $$\frac{Y(f_0)}{R(f_0)} = T(f_0). \quad (1)$$

Incrementing $f_0$ across the relevant frequency band yields a frequency response function T(f) for the closed-loop system $$\frac{Y(f)}{R(f)} = T(f) = \frac{P(f) C(f)}{1 + P(f) C(f)}, \quad (2)$$

where the last relationship follows from simple scalar block diagram mathematics. Similar analysis of the error signal $E(f) = R(f) - Y(f)$ produces the relation $$\frac{Y(f)}{E(f)} = \frac{T(f)}{1 - T(f)} = P(f) C(f) \quad (3)$$

If the compensator frequency response function C(O is known, this function can be divided out at each frequency to yield the processor frequency response function P(f).

It is also fairly common to make measurements of MIMO systems of the type shown in FIG. 2. Here the frequency response function matrix describes injection of input signals $X_j$ at the various input terminals and read-out of output signals $Y_i$ at the various output terminals. The frequency response function matrix M, which represents the effect of the module 31, satisfies $Y = MX$, where the input vector X and output vector Y have the respective dimensions $n_1 \times 1$ (rows×columns) and $n_2 \times 1$, viz.

$$\begin{bmatrix} y_1 \\ y_2 \\ \cdots \\ y_{n2} \end{bmatrix} = \begin{bmatrix} M_{11} & \cdots & M_{1,n1} \\ M_{21} & \cdots & M_{2,n1} \\ \cdots & \cdots & \cdots \\ M_{n2,1} & \cdots & M_{n2,n1} \end{bmatrix} \begin{bmatrix} x_1 \\ x_2 \\ \cdots \\ x_{n1} \end{bmatrix} \qquad (4)$$

The number of reference input signals ($n_1$) and controlled output signals ($n_2$) for a MIMO system often, but not always, agree ($n_1=n_2$) so that the number of input signals or output signals is the same. Note that the compensator/plant/sensor module 31 in FIG. 2 may be an open-loop system itself, in which case an input signal $X_j$ would represent $U_j$, or may be a closed-loop system, in which case $X_j$ would represent a reference signal $R_j$. In the latter case, the module 3 1 can represent one of several general closed-loop maps and the column vector Y of output signals $Y_i$ would be of the same dimension as the column vector X of input signals $X_j$.

Frequency response analysis and transfer function analysis typically involve an implicit assumption that the system is linear or is operating within its linear region. A few important exceptions exist, such as describing function analysis, but these are not of concern here. If the system nonlinearities are significant, it does make a difference whether the measurement is a series of SISO or single-input, multi-output ("SIMO") measurements or is a single MIMO measurement. However, if the system is operating in its linear region, superposition can be used to synthesize responses to multiple input signals from a series of single input signals. In this linear situation, statistical properties and convenience often determine how the measurement should be carried out.

Some prior work has been performed on measuring SISO and MIMO system parameters and on extracting parametric curve fits from open-loop measurements on such systems. Some work has also been performed on unwrapping closed-loop SISO measurements.

P. L. Lin and Y. C. Wu, in "Identification of Multiinput Multi-output Linear Systems From Frequency Response Data", Trans. ASME, vol. 104 (1982) pp. 58-64, disclose a procedure for determining transfer function parameters for a multiple inputmultiple output linear system, using representation of the transfer function as a numerator frequency polynomial with matrix coefficients divided by a denominator frequency polynomial with matrix coefficients. Output versus input measurements are performed on the system at a sequence of selected frequencies, and the numerator and denominator matrix entries are determined by successive approximations of increasing polynomial degree. It is difficult to determine the magnitude of error present when the polynomials are truncated at selected degrees.

Hewlett Packard Company Application Note 243—2, "Control System Development Using Dynamic Signal Analyzers", 1984, pp. 1-64, discusses the open loop and closed loop models for a SISO linear control system and indicates some of the measurement techniques available at that time (1984) for analysis of a general control system.

E. S.Atkinson et al, in "Low-frequency Analyzer Combines Measurement Capability with Modeling and Analysis Tools", Hewlett Packard Jour., January 1987, pp. 4-16, discusses use of a two-channel Fast Fourier Transform analyzer to measure parameters in a linear SISO control system.

R. C. Blackham et al, in "Measurement Modes and Digital Demodulation for a Low frequency Analyzer", Hewlett Packard Jour., January 1987, pp. 17-25, discusses use of low frequency measurements to determine parameters for a linear SISO control system.

J. L. Adcock, in "Analyzer Synthesizes Frequency Response of Linear Systems" and in "Curve Fitter for Pole-zero System", Hewlett Packard Jour., January 1987, pp. 25-32 and 33-36, discusses use of low pole-zero techniques to determine the numerator and denominator parameters for a linear SISO control system.

R. L. Dailey and M. S. Lukich, in "MIMO Transfer Function Curve Fitting Using Chebyshev's Polynomials", published by TRW Space & Technology Group, 1987 and presented at the 35th Annual Meeting of the Society of Industrial and Applied Mathematics, Denver, Colo., October 1987, disclose an extension of Chebyshev analysis of a SISO system to analysis of an MIMO system. The conventional matrix equation $G(s)=N(s)/D(s)$ for the transfer function is reformulated as an equation $G(s)D(s)-N(s)=0$ that is linear in all the unknown entries of the matrices $D(s)$ and $N(s)$, where $s=j\omega$. This last equation is solved as a set of simultaneous equations, using singular value decomposition techniques applied to Chebyshev polynomial expansions in the frequency $\omega$ for the matrix functions $D(s)$ and $N(s)$.

Hewlett Packard Company Product Note HP 3562A/3563A-1, "Measuring the Open-loop Frequency Response of the Phase-locked Loop", discusses measurement of PLL parameters for a linear MIMO control system and in other environments.

What is needed is an approach that provides an instrument that extracts MIMO open-loop frequency response functions for a physical system from MIMO closed-loop measurements. Preferably, this approach should provide a non-parametric method of obtaining open-loop responses from closed-loop measurements on a single-input or multiple-input, single-output or multiple-output control system. The method should allow unwrapping of measurements of closed-loop MIMO system to recover the open-loop frequency response function matrix of that MIMO system. The method should be flexible enough to provide measurements of various system parameters, depending upon which system signals are measured, and should extend the capabilities of instruments for unwrapping measurements of SISO systems and those instruments capable of measuring, but not unwrapping, a MIMO loop.

SUMMARY OF THE INVENTION

These needs are met by the invention, which in one embodiment focuses on a control system arranged in a First Configuration, as defined below. This system includes a difference module, a controller module and a plant module, arranged serially in a forward direction, and a sensor module, positioned in the return portion of a feedback loop. The control system is assumed to be operating within its linear operating range. In a first mode, the difference module receives an input signal vector R as a vector array of $n_1$ component input signals at a first input terminal and receives an estimate signal vector Z (unspecified as yet) as an array of $n_1$ signals at a second input terminal. The difference module issues a difference module output signal vector $E=R-Z$, and E is received as an input signal vector at an input terminal of the controller module. The controller module issues an intermediate output signal vector $U=CE$, where C is a determinable matrix having $n_3$ rows and $n_1$ columns, as a vector array of $n_3$ signals, and this output signal is received as an input signal vector at an input terminal of the plant module. The plant module issues a control system output signal vector $Y=PU=PCE$, where P is a matrix having $n_2$ rows and $n_3$ columns, and this output signal is also received as an input signal vector at an input terminal of the sensor module. The sensor module issues an output estimate signal vector $Z=HY=HPU=HPCE$, where H is a matrix having $n_1$ rows and $n_2$ columns, and the estimate signal Z is received at the second input terminal of the difference module. Here, $n_1$, $n_2$ and $n_3$ are arbitrary positive integers. The parameters of the controller module, represented by the matrix C, are assumed to be determinable or known. The entries of an $n_1 \times n_1$ combination matrix $T=HPC(I+HPC)^{-1}$ and the matrices HPC and HP are then determined from the relations $Z=TR$, $HPC=T(I-T)^{\dagger}=(I-T)^{\dagger}T$ and $HP=T(I-T)^{\dagger}C^{\dagger}=(I-T)^{\dagger}TC^{\dagger}$. Here $C^{\dagger}$ is the inverse matrix or a pseudo inverse matrix of the matrix C, called a "quasi-inverse" here and satisfying $C^{\dagger}C=I$ or $CC^{\dagger}=I$ (or both); and similarly for the quasi-inverse $(I-T)^{\dagger}$.

In a second mode of the first embodiment, the input signal vector R is again received and the resulting signal vector $E=(I+HPC)^{\dagger}R=SR$ is measured. A sensitivity matrix S is then determined, and the matrix HP is determined from $HP=(S^{\dagger}-I)C^{\dagger}$. In third and fourth modes of the first embodiment, defining relations are $U=(I+CHP)^{\dagger}CR=C(I+HPC)^{\dagger}R$ and $Y=(I+PCH)^{\dagger}PC=PC(I+HPC)^{\dagger}R$, respectively.

In a first mode of a second embodiment of the invention, a feedback loop includes a difference module, a controller module, a sum module and a plant module, arranged in that order in a Second Configuration. The difference module receives a first reference signal $R_1$ and a comparison signal $Y_2$ and forms and issues a difference or error signal $E_1=R_1-Y_2$. The controller module receives the error signal $E_1$ and forms and issues a controller output signal $Y_1=CE_1$. The sum module receives a second reference signal $R_2$ and the controller output signal $Y_1$ and forms and issues a sum signal $E_2=R_2+Y_1$. The plant module receives the sum signal $E_2$ and forms and issues an output signal $Y_2=PE_2$, which is received at one input terminal of the difference module as a comparison signal. Four combination matrices $T_1=C(I+PC)^{\dagger}$, $T_2=-CP(I+CP)^{\dagger}$, $T_3=PC(I+PC)^{\dagger}$ and $T_4=P(I+CP)^{\dagger}$, having the respective dimensions $n_2 \times n_1$, $n_2 \times n_2$, $n_1 \times n_1$ and $n_1 \times n_2$, are introduced, and their entries are determined from the relations $Y_1=(T_1)(R_1)+(T_2)(R_2)$ and $Y_2=(T_3)(R_1)+(T_4)(R_2)$, where the matrices $R_1$ and $R_2$ are known. The matrices $Y_1$ and $Y_2$ are found by measurement, and $T_1$, $T_2$, $T_3$ or $T_4$ and PC or CP are determined from the measurements of $Y_1$ and $Y_2$.

In a second mode of the second embodiment using the Second Configuration, four combination matrices $S_1=(I+PC)^{\dagger}$, $S_2=-P(I+CP)^{\dagger}$, $S_3=C(I+PC)^{\dagger}$ and $S_4=(I+CP)^{\dagger}$, having the respective dimensions $n_1 \times n_1$, $n_1 \times n_2$, $n_2 \times n_1$ and $n_2 \times n_2$, are introduced, and their entries are determined from the relations $E_1=(S_1)(R_1)+(S_2)(R_2)$ and $E_2=(S_3)(R_1)+(S_4)(R_2)$, where the matrices $R_1$ and $R_2$ are again known. The matrices $R_1$ and $R_2$ are found by measurement, and $S_1$, $S_2$, $S_3$ and/or $S_4$ and PC and/or CP are determined from the measurements of $E_1$ and $E_2$.

In a Third Configuration, a feedback loop includes a difference module $(E_1=R_1-Y_3)$, a compensator module $(Y_1=CR_1)$, a sum module $(E_2=R_2+Y_1)$ and a plant module $(Y_2=PE_2)$, arranged serially in the forward direction, and a sum module $(E_3=R_3+Y_2)$ and a sensor module $(Y_3=HE_3)$, arranged serially in the return portion of the feedback loop. The Third Configuration includes the features of the First and Second Configurations, receives three input signal vectors, $R_1$, $R_2$ and $R_3$, and produces three measurable intermediate output signals $E_1$, $E_2$ and $E_3$ or three other measurable intermediate output signals $Y_1$, $Y_2$ and $Y_3$. In a first mode of a third embodiment of the invention, the defining equations become $E_i=S_{i1}R_1+S_{i2}R_2+S_{i3}R_3 (i=1, 2, 3)$. These equations define nine matrices $S_{ij}=(I+HPC)^{\dagger}A_{ij}$ or $S_{ij}=(I+CHP)^{\dagger}A_{ij}$ or $S_{ij}=(I+PCH)^{\dagger}A_{ij}$, where the matrices $A_{ij}$ are of the form I, C, P, H, PC, HP, CH, HPC, CHP or PCH. The forms of the matrices $S_{ij}$ are determined, and these defining equations are then unwrapped to determine the form of the matrix P or HP. In a second mode of the third embodiment, the defining equations become $Y_i=T_{i1}R_1+T_{i2}R_2+T_{i3}R_3$ $(i=1, 2, 3)$, where the nine matrices $T_{ij}$ are determinable and have forms similar to the matrices $S_{ij}$ of the first mode of the third embodiment. The defining equations are unwrapped to determine the form of the matrix P or HP.

DESCRIPTION OF THE PREFERRED EMBODIMENTS

Figure 1:
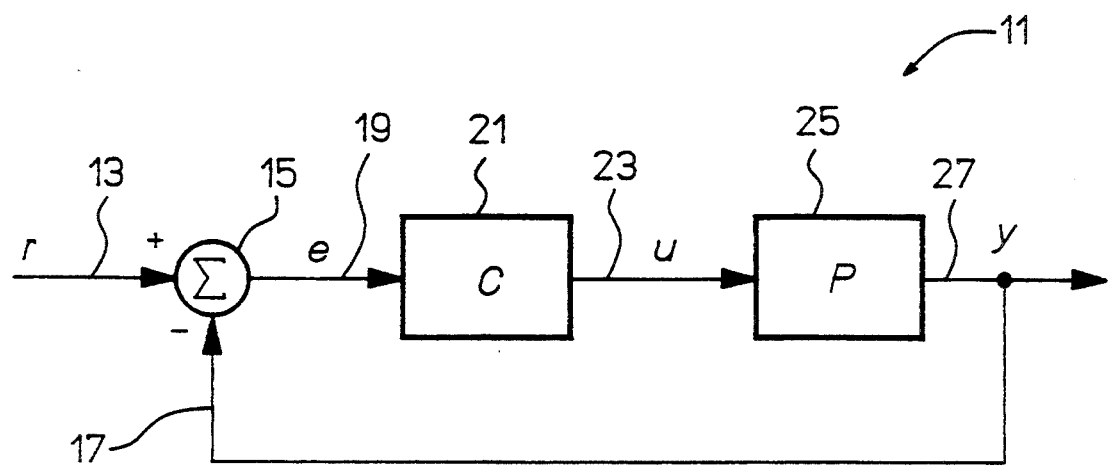
FIG. 1 is a schematic view of a single input, single output, closed-loop control signal processing system analyzed by an application of the invention.
Figure 2:
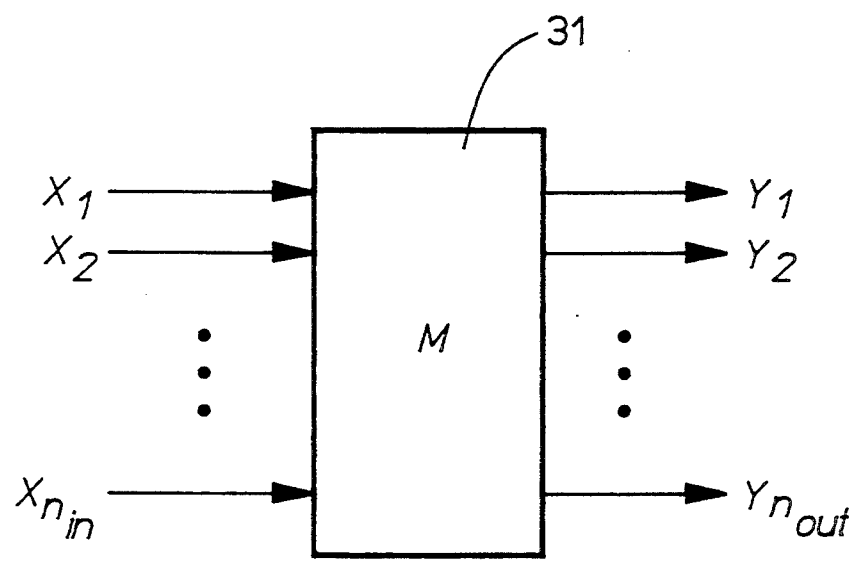
FIG. 2 is a schematic view of a general multiple-input, multiple-output signal processing system that may be either an open-loop or closed-loop system internally.
Figure 3:
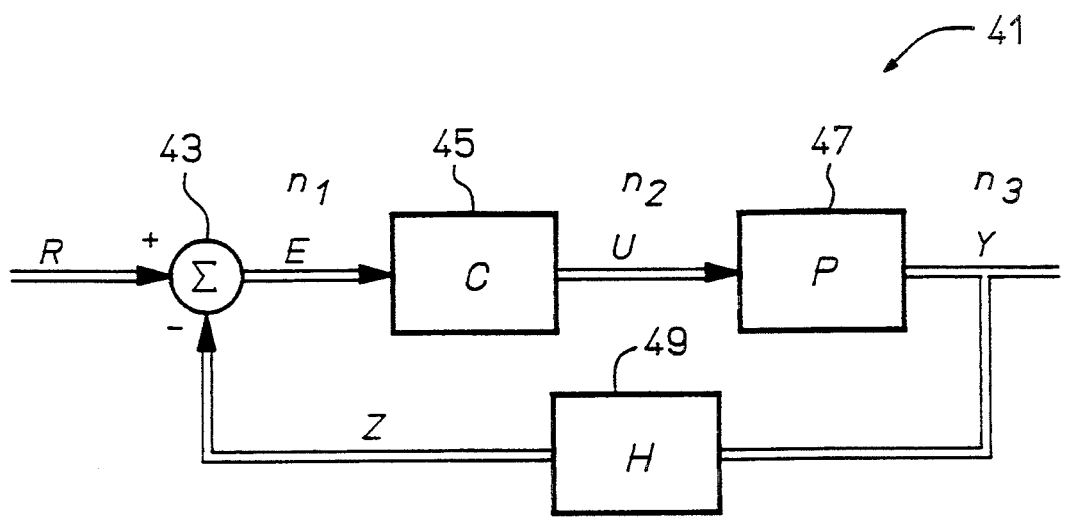
FIGS. 3, 4 and 5 are schematic views of general multiple-input, multiple-output, closed-loop systems in a First Configuration, a Second Configuration and a Third Configuration, respectively, to which the invention applies.

A control system illustrating a First Configuration embodiment 41, shown in FIG. 3, includes: (1) a difference module 43 that forms a difference signal $E=R-Z$ between a system input signal R and an estimate signal Z; (2) a controller module 45 that receives the difference signal E as an input signal and, in response to receipt of E, issues an intermediate signal $U=CE$ as an output signal; (3) a physical system or plant module 47 that receives the intermediate signal U and, in response to receipt of U, issues a system output signal $Y=PU$; and (4) a sensor module 49, positioned in a feedback path to the difference module 43, that receives the system output Y as an input signal and, in response to receipt of Y, issues the estimate signal $Z=HY$ as an output signal. Here C, P and H are matrices having dimensions $n_3 \times n_1$, $n_2 \times n_3$ and $n_1 \times n_2$, respectively, where $n_1$, $n_2$ and $n_3$ are selected positive integers. This paragraph and the accompanying FIG. 3 define what will be referred to as a First Configuration control system.

Here, C, P, and H denote matrices of transfer functions or frequency response functions. H represents the sensor dynamics, which is often considered part of the plant module 47 in the SISO case and may be included therein. At any given frequency the matrix P associated with the plant module 47 has $n_2$ rows and $n_3$ columns. The controller module 45 has a matrix C associated with this module. The matrices H and C have the appropriate dimensions for the matrix multiplication to make sense. R, Z, and E are all input signal or intermediate signal column vectors with dimensions $n_1 \times 1$, and Y is an output signal column vector with dimensions $n_2 \times 1$.

The closed-loop transfer function matrices can be found in many texts and make use of matrix transfer function mathematics. However, matrix multiplication does not commute. One cannot simply divide an output signal vector by an input signal vector to obtain a frequency response of the system. This simple fact has been a point of difficulty in extending the previously mentioned SISO identification algorithms to MIMO systems. However, the same techniques used to arrive at the closed-loop transfer functions from open-loop quantities can be modified to produce open-loop transfer functions from closed-loop measurements in a linear operating region of the system.

The closed-loop transfer function matrices are determined from the relations $$Y = PCE \quad (5)$$

$$Z = HY = HPCE, \quad (6)$$

$$E = R - Z, \quad (7)$$

$$U = CE = C(R - Z), \quad (8)$$

$$Y = PC(R - HY), \quad (9)$$

$$(I + PCH)Y = (PC)R, \quad (10)$$

$$Y = (I + PCH)^{-1}PCR = PC(I + HPC)^{-1}R, \quad (11)$$

$$Z = HPC(I + HPC)^{-1}R = (I + HPC)^{-1}HPC\ R. \quad (12)$$

Because (I+HPC) and (I+PCH) are square matrices of size $n_1 \times n_1$ and $n_2 \times n_2$, respectively, one or the other of these matrices will be invertible if it has full rank. If I+HPC has full rank, for example, Eq. (12), relating the measurable vector Z and the specifiable vector R, can be used to determine the entries of the matrix PC. If neither of the matrices I+PCH and I+HPC has full rank, the pseudo-inverse of the matrix I+PCH or I+HPC is assumed to be used here. One usually knows or can independently measure the elements of the compensator matrix C so that only P and/or H must be identified. It is often possible to measure H independently. However, sometimes it is only possible to measure H combined with P. Thus, the combined term L=HP is identified, using Eq. (12), by injecting signal at R and reading responses at Z. In fact, it is natural to measure HP because this combination is what the compensator sees when performing its control functions.

In a first version or mode of analysis of the First Configuration, if T denotes the closed-loop frequency response or transfer function matrix from R to Z, $$T = (I + HPC)^{-1}HPC = HPC(I + HPC)^{-1}, \quad (13)$$

and T is a $n_1 \times n_1$ matrix. Because the control system in question is either linear or assumed to be operating in the linear regime, each entry $T_{ij}$ of the matrix T can be measured by injecting a reference input signal $R_j$ and reading the resulting response $Z_i$. Unwrapping this transfer function proceeds analogously to the SISO case, and one verifies that $$HPC = T(I - T)^{-1} = (I - T)^{-1}T. \quad (14)$$

If the inverse of C, $C^{-1}$, exists, then $$L = HP = T(I - T)^{-1}C^{-1} = (I - T)^{-1}TC^{-1}. \quad (15)$$

The matrix C must be square ($n_1 = n_3$) and must have full rank if the formal inverse $C^{-1}$ is to exist. Each matrix of the form (I+X) is already a square matrix, and if (I+X) has full rank the inverse of this matrix will exist. If C is not square, HP can still be approximated by least-squares approximation by post-multiplying HPC by the pseudo-inverse of C, denoted $C^\dagger$. For ease of reference herein, the formal inverse of a matrix such as C, or the pseudo-inverse of that matrix if the formal inverse does not exist, will be collectively referred to as a "quasi-inverse" $C^\dagger$ of that matrix; if the formal inverse of a matrix exists, the quasi-inverse is identical with the formal inverse of that matrix. For control purposes, the combination L=HP can be simply considered the physical system or plant module representative to be controlled, and the entries of HP are to be determined.

It is assumed here that C is known or determinable, although the inverse $C^{-1}$ need not exist, and that the entries of the matrix L=HP (dimensions $n_1 \times n_3$) are unknown. The problem associated with the First Configuration embodiment illustrated in FIG. 3 may be stated as follows: (1) Each of $n_1$ linearly independent reference input signals $R_i$ (i = 1, ..., $n_1$) is provided at the input terminal of the control system shown in FIG. 3; (2) Application of the input signal $R_i$ produces an intermediate vector signal U and a sensor module output vector signal Z is read; and (3) Eq. (14) and the relations $Z_i = \Sigma_j T_{ij} R_j$ (i = 1, ... $n_1$), with $R_j$ known and $Z_i$ measurable, are to be solved to determine the entries of the unknown matrix HPC; (4) the entries of the unknown matrix L=HP are to be determined using Eq. (15) with $C^{-1}$ replaced by the quasi-inverse $C^\dagger$. The steps (3) and (4) "unwrap" the unknown matrix HP in two steps.

In a second mode of analysis of the First Configuration, the input signal vector R is again injected and the resulting signal vector E is determined. Here, the defining equations become, by analogy with Eqs. (5)–(12), $$Y = PCE, \quad (16)$$

$$Z = HPCE, \quad (17)$$

$$E = R - HPCE = (I + HPC)^\dagger R = SR, \quad (18)$$

which defines an $n_1 \times n_1$ matrix S whose entries are determined from Eq. (18). Equation (18) is similarly unwrapped to produce $$HP = (S^\dagger - I)C^\dagger. \quad (19)$$

In a third mode of analysis of the First Configuration, the input signal R is injected and the resulting signal vector U is determined. The defining equation replacing (18) becomes $$(I + CHP)U = CR. \quad (20)$$

$$U = VR = (I + CHP)^{\dagger} CR = C(I + HPC)^{\dagger} R, \quad (21)$$

which may be unwrapped to produce $$HP = C^{\dagger}[(VC^{\dagger})^{\dagger} - I] = [(C^{\dagger}V)^{\dagger} - I]C^{\dagger}. \quad (22)$$

In a fourth mode of analysis of the First Configuration, the input signal R is injected and the resulting vector signal Y is determined. The defining equation replacing Eq. (18) produces $$(I + PCH)Y = PCR, \quad (23)$$

$$Y = WR = (I + PCH)^{\dagger} PCR = PC(I + HPC)^{\dagger} R. \quad (24)$$

$$HP = HW(I - HW)^{\dagger} C^{\dagger} = (I - HW)^{\dagger} HWC^{\dagger}. \quad (25)$$

For extraction of HP, Eq. (25) requires knowledge of H, which may not be available.

Figure 4:
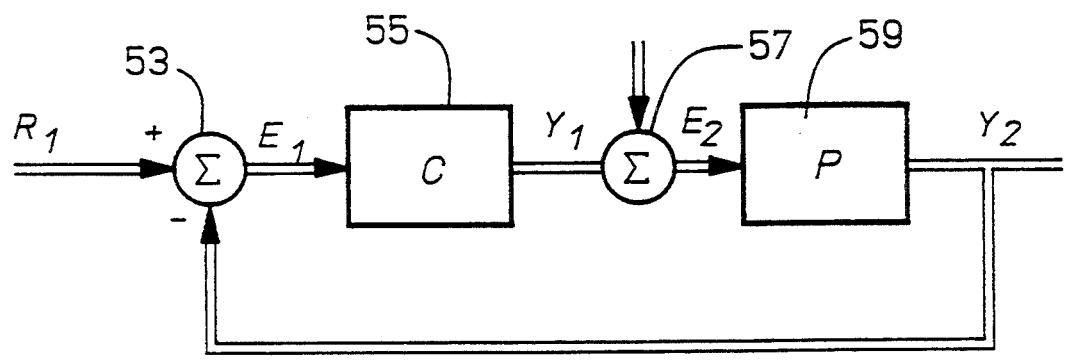

A Second Configuration 51 of a feedback loop, illustrated in FIG. 4, includes a difference module 53, a controller module 55, a sum module 57 and a plant module 59, arranged in that order in a feedback loop. This assumes, without loss of generality, that the sensor dynamics of a sensor module (matrix H) have been included in the dynamics of the plant module 59 (matrix P). The above loop-unwrapping algorithm can be extended to any general input/output configuration, such as the Second Configuration shown in FIG. 4. In comparing this configuration with FIG. 3, note that $R_1 = R$, $E_1 = E$, $E_2 = U$, and $Y_2 = Z$.

It is straightforward to verify the relations $$\begin{bmatrix} Y_1 \\ Y_2 \end{bmatrix} = \begin{bmatrix} C(I + PC)^{\dagger} & -CP(I + CP)^{\dagger} \\ PC(I + PC)^{\dagger} & P(I + CP)^{\dagger} \end{bmatrix} \begin{bmatrix} R_1 \\ R_2 \end{bmatrix} = \quad (26)$$

$$\begin{bmatrix} T_1 & T_2 \\ T_3 & T_4 \end{bmatrix} \begin{bmatrix} R_1 \\ R_2 \end{bmatrix},$$

or, equivalently, $$\begin{bmatrix} E_1 \\ E_2 \end{bmatrix} = \begin{bmatrix} (I + PC)^{\dagger} & -P(I + CP)^{\dagger} \\ C(I + PC)^{\dagger} & (I + CP)^{\dagger} \end{bmatrix} \begin{bmatrix} R_1 \\ R_2 \end{bmatrix} = \quad (27)$$

$$\begin{bmatrix} S_1 & S_2 \\ S_3 & S_4 \end{bmatrix} \begin{bmatrix} R_1 \\ R_2 \end{bmatrix}.$$

The entries of any of the four matrices $T_1$, $T_2$, $T_3$ or $T_4$, or of any of the four matrices $S_1$, $S_2$, $S_3$ or $S_4$, can be determined from Eqs. (26) or from Eqs. (27) and used to determine the matrix PC or CP. A quasi-inverse matrix $C^{\dagger}$ can then be constructed and used to determine the entries of the unknown matrix $P = (PC)C^{\dagger}$ or $P = C^{\dagger}(CP)$. The entries of the matrices $T_i$ or $S_j$ ($i = 1, 2, 3, 4$; $j = 1, 2, 3, 4$) are determined and used to find the entries of PC or CP.

$$PC = (T_1)^{\dagger} C - I, \quad (28)$$

$$CP = -T_2(I + T_2)^{\dagger} = -(I + T_2)^{\dagger} T_2, \quad (29)$$

$$PC = T_3(I - T_3)^{\dagger} = (I - T_3)^{\dagger} T_3, \quad (30)$$

$$CP = CT_4(I - CT_4)^{\dagger} = (I - CT_4)^{\dagger} CT_4, \quad (31)$$

$$PC = S_1^{\dagger} - I, \quad (32)$$

$$CP = -CS_2(I + CS_2)^{\dagger} = -(I + CS_2)^{\dagger} CS_2, \quad (33)$$

$$PC = S_3^{\dagger} C - I, \quad (34)$$

$$CP = S_4^{\dagger} - I. \quad (35)$$

Although FIGS. 3 and 4 illustrate the First Configuration and the Second Configuration by use of a difference module 43, or use of a difference module 53 and a sum module 57, these modules may each be independently chosen to be a sum module or a difference module, with straightforward changes being made in the defining equations. Each of the two choices of the linear combination module 43 (sum or difference) for the First Configuration produces a set of equations analogous to Eqs. (5)–(15). Each of the four choices of pairs of linear combination modules 53 and 57 (sum/sum, sum/difference, difference/sum or difference/difference) for the Second Configuration produces a set of equations analogous to Eqs. (28)–(35). It is possible to unwrap any of the MIMO loops associated with Eqs. (26) or (27) to obtain P. Which loop one measures depends only upon the relative convenience and accuracy of different input/output signal pairs. Certain input signals or output signals may not be accessible. Also, some of these loops are mathematically equivalent, using certain "push-through" matrix identities and multiplication by $C^{-1}$. If $C^{-1}$ does not exist, the pseudo-inverse $C^{\dagger}$ should be used. Essentially, the problem reduces to unwrapping one of four MIMO loops:

$$(I + CP)^{\dagger},$$

$$(I + PC)^{\dagger},$$

$$(I + PC)^{\dagger} PC = PC(I + PC)^{\dagger},$$

$$CP(I + CP)^{\dagger} = (I + CP)^{\dagger} CP,$$

and these fall within two forms:

$$A = (I + G_1)^{\dagger} \quad (36)$$

$$B = (I + G_2)^{\dagger} G_2 = G_2(I + G_2)^{\dagger}, \quad (37)$$

where A, B, $G_1$ and $G_2$ are matrices. These are unwrapped using the relations $$G_1 = A^{\dagger} - I, \quad (38)$$

$$G_2 = B(I - B)^{\dagger} = (I - B)^{\dagger} B. \quad (39)$$

Depending upon whether the matrix $G_1$ or $G_2$ is CP or PC, P can be recovered by pre- or post-multiplying by the formal inverse $C^{-1}$ or by the pseudo-inverse $C^{\dagger}$.

Figure 5:
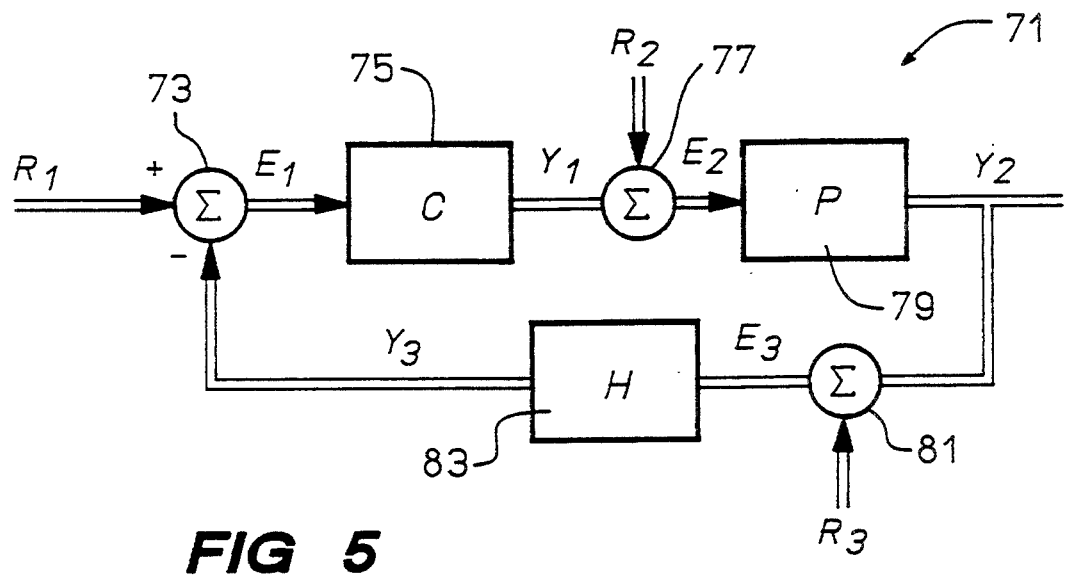

FIG. 5 illustrates a Third Configuration of a feedback loop 71 to which the invention applies. A first difference module or sum module 73, hereafter collectively referred to as a "linear combination module", receives a first external signal $R_1$ and a comparison signal $Y_3$, each a vector array of $n_1$ signals, at two input terminals of the module and forms and issues the linear combination $R_1 + Y_3$ or $R_1 - Y_3$, according to choice, at the output terminal of the first linear combination module 73. For purposes of illustration here, the difference $E_1 = R_1 - Y_3$ will be used for the first linear combination issued at the output terminal of the first linear combination module 73. The vector array $E_1$ is received at an input terminal of a compensator module 75, represented by an $n_2 \times n_1$ compensator matrix C, and the module 75 forms and issues at an output terminal of the module 75 a first intermediate signal $Y_1=CE_1$. The first intermediate signal $Y_1$ and a second external signal $R_2$ are received at first and second input terminals of a second linear combination module 77, which forms and issues an second linear combination output signal $E_2=R_2+Y_1$ or $E_2=R_2-Y_1$ at its output terminal. For purposes of illustration, the output signal $E_2=R_2+Y_1$ will be used here. The second linear combination module output signal $E_2$ is received at an input terminal of a plant module 79, represented by an $n_3 \times n_2$ plant module matrix P, and the module 79 forms and issues at an output terminal of the module 79 a second intermediate output signal $Y_2=PE_2$. The second intermediate output signal $Y_2$ and a third external signal $R_3$ are received at first and second input terminals of a third linear combination module 81, which forms and issues a third linear combination output signal $E_3=R_3+Y_2$ or $E_3=R_3-Y_2$ at its output terminal. For purposes of illustration, the output signal $E_3=R_3+Y_2$ will be used here. The third linear combination output signal $E_3$ is received at an input terminal of a sensor module 83, represented by an $n_1 \times n_3$ sensor matrix H, and the module 83 forms and issues at an output terminal of the module 83 a third intermediate output signal $Y_3=HE_3$. The third intermediate output signal $Y_3$ is received at the second input terminal of the first linear combination module 73.

By analogy with the relations developed for the First Configuration and for the Second Configuration above, the relations for the Third Configuration shown in FIG. 5 are as follows.

$$E_1 = R_1 - Y_3, \quad (40)$$

$$Y_1 = CE_1, \quad (41)$$

$$E_2 = R_2 + Y_1, \quad (42)$$

$$Y_2 = PE_2, \quad (43)$$

$$E_3 = R_3 + Y_2, \quad (44)$$

$$Y_3 = HE_3. \quad (45)$$

Equations (40)–(45) may be rearranged to produce the following matrix equations relating the first, second and third linear combination module output signals to the first, second and third external signals.

$$\begin{bmatrix} E_1 \\ E_2 \\ E_3 \end{bmatrix} = \begin{bmatrix} Q_1\{R_1 - HPR_2 - HR_3\} \\ Q_2\{CR_1 + R_2 - CHR_3\} \\ Q_3\{PCR_1 + PR_2 + R_3\} \end{bmatrix} = \quad (46)$$

$$\begin{bmatrix} S_{11} & S_{12} & S_{13} \\ S_{21} & S_{22} & S_{23} \\ S_{31} & S_{32} & S_{33} \end{bmatrix} \begin{bmatrix} R_1 \\ R_2 \\ R_3 \end{bmatrix}$$

$$Q_1 = (I + HPC)^\dagger, \quad (47)$$

$$Q_2 = (I + CHP)^\dagger, \quad (48)$$

$$Q_3 = (I + PCH)^\dagger. \quad (49)$$

The matrices $Q_1$, $Q_2$ and $Q_3$ are square matrices of sizes $n_1 \times n_1$, $n_2 \times n_2$ and $n_3 \times n_3$, respectively. Equations (46) provide the entries of the matrices $S_{ij}$ (i,j=1,2,3) and provide the following formal solutions for the matrix HP.

$$HP = (S_{11}^\dagger - I)C^\dagger, \quad (50)$$

$$HP = -S_{12}(I + CS_{12})^\dagger, \quad (51)$$

$$P = -(H^\dagger + S_{13}^\dagger)C^\dagger, \quad (52)$$

$$HP = S_{21}^\dagger - C^\dagger, \quad (53)$$

$$HP = C^\dagger(S_{22}^\dagger - I), \quad (54)$$

$$P = -S_{23}^\dagger - (CH)^\dagger, \quad (55)$$

$$P = S_{31}(I - HS_{31})^\dagger C^\dagger = (I - S_{31}H)^\dagger S_{31}C^\dagger, \quad (56)$$

$$P = (I - S_{32}CH)^\dagger S_{32}, \quad (57)$$

$$P = (S_{33}^\dagger - I)(CH)^\dagger, \quad (58)$$

where it is assumed that the matrices $C^\dagger$, $(CH)^\dagger$ and the other quasi-inverses exist.

The corresponding matrix equations relating the first, second and third intermediate output signals $Y_1$, $Y_2$ and $Y_3$ to the first, second and third external signals are as follows.

$$\begin{bmatrix} Y_1 \\ Y_2 \\ Y_3 \end{bmatrix} = \begin{bmatrix} CQ_1\{R_1 - HPR_2 - HR_3\} \\ PQ_2\{CR_1 + R_2 - CHR_3\} \\ HQ_3\{PCR_1 + PR_2 + R_3\} \end{bmatrix} = \quad (59)$$

$$\begin{bmatrix} T_{11} & T_{12} & T_{13} \\ T_{21} & T_{22} & T_{23} \\ T_{31} & T_{32} & T_{33} \end{bmatrix} \begin{bmatrix} R_1 \\ R_2 \\ R_3 \end{bmatrix}.$$

Equations (59) provide the entries of the matrices $T_{ij}$ (ij=1,2,3) and provide the following formal solutions for the matrix HP. Some loops require a knowledge of H in order to unwrap such loops.

$$HP = T_{11}^\dagger - C^\dagger = HP, \quad (60)$$

$$HP = -C^\dagger[(I + T_{12})^\dagger T_{12}, \quad (61)$$

$$P = -T_{13}^\dagger - (CH)^\dagger, \quad (62)$$

$$P = (I - T_{21}H)^\dagger T_{21}C^\dagger, \quad (63)$$

$$P = (I - T_{22}CH)^\dagger T_{22}, \quad (64)$$

$$P = -(I + T_{23})^\dagger T_{23}(CH)^\dagger, \quad (65)$$

$$HP = (I - T_{31})^\dagger T_{31}C^\dagger, \quad (66)$$

$$HP = T_{32}(I - CT_{32})^\dagger, \quad (67)$$

$$P = (T_{33}^\dagger - H^\dagger)C^\dagger, \quad (68)$$

where it is assumed that the matrices $C^\dagger$, $(CH)^\dagger$ and the other quasi-inverses exist.

Figure 6:
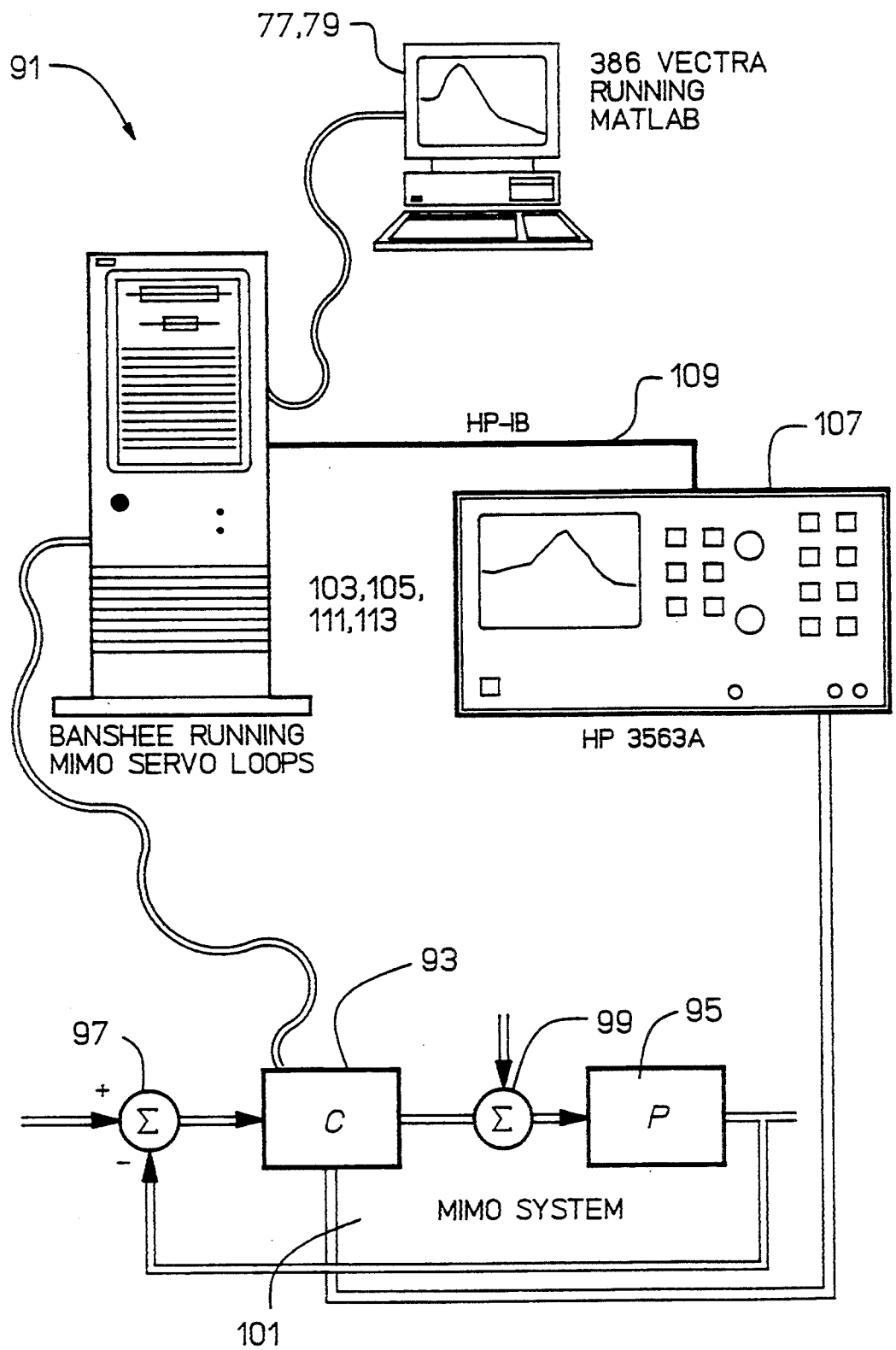
FIGS. 6 and 7 illustrate a physical layout of a system that uses the invention.
Figure 7:
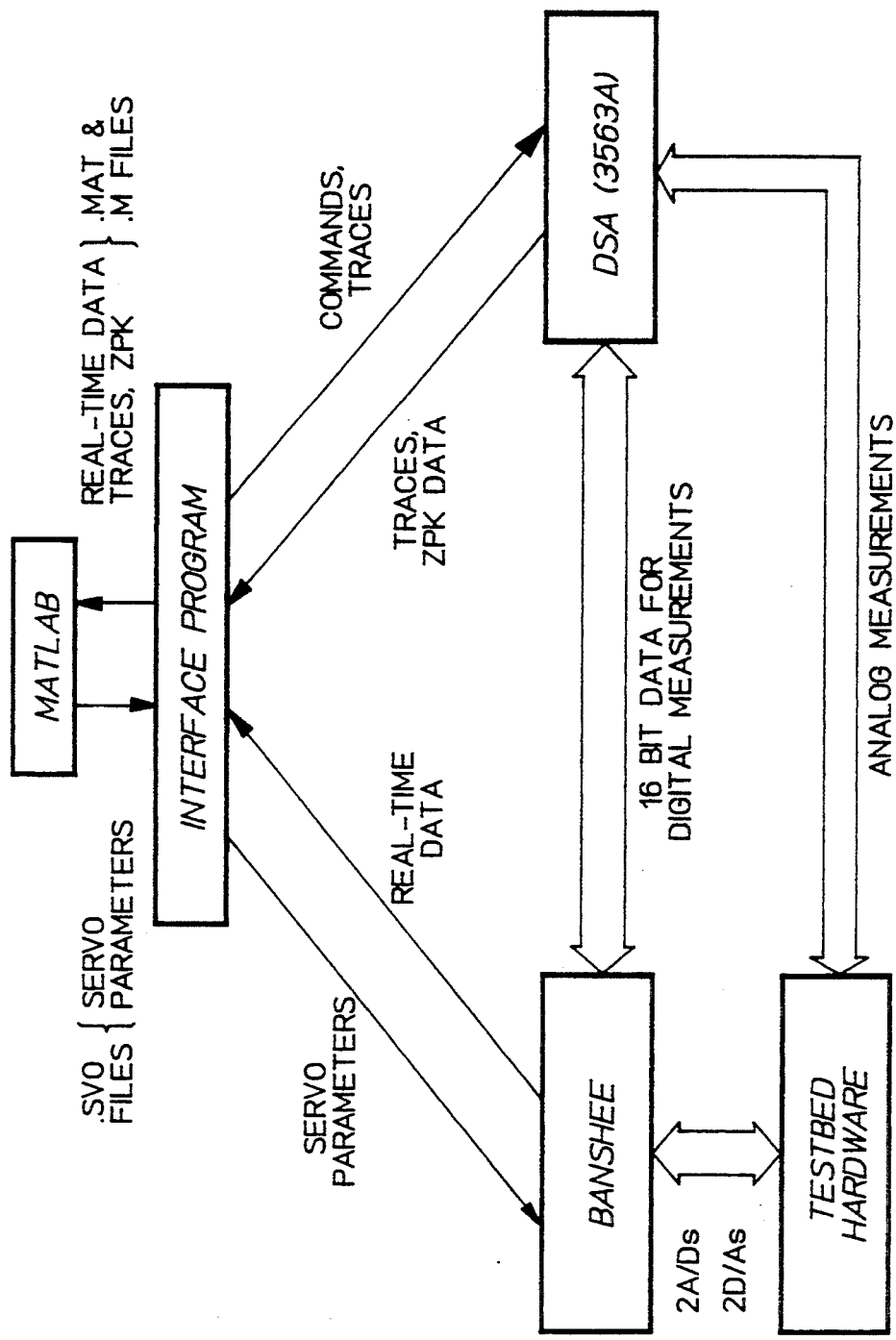

The invention disclosed here is applicable to general classes of closed-loop feedback systems, for purposes of determining the parameters that define the matrices that describe operation of the feedback system in a linear operating regime. One example of such an application is as interface apparatus between a control systems analyzer ("CSA"), such as the Hewlett Packard HP 3563A, a digital signal processing ("DSP") board, such as the Banshee DSP board offered by Atlanta Signal Processing, Inc. ("ASPI"), and the Matlab mathematics program offered by The Mathworks, as illustrated in FIGS. 6 and 7. The interface apparatus allows direct digital measurements to be made of feedback control loop parameters implemented with the DSP board. Analog measurements made with the CSA can be passed to Matlab through the same interface. The menu-driven interface apparatus between the DSP board and Matlab, provided by the invention disclosed here, ties these two devices together and expands CSA capability to MIMO systems.

FIG. 6 illustrates a physical layout of a system 91 that has been constructed and used for measurements of MIMO systems. The system 91, referred to as a Multivariable Work Station ("MWS"), includes a MIMO controller module 93 (matrix C) that controls a MIMO physical system or plant module 95 (matrix P). The combination of these two modules, plus a first linear combination module 97 and a second linear combination module 99, forms a Second Configuration feedback loop 101 as shown. The controller module 93 is implemented on an ASPI Banshee Board 103 based on a Texas Instruments TMS 320C30 digital signal processing chip. This board fits into the backplane of an AT-compatible computer 105, such as a Hewlett Packard Vectra RS/16 80386-based computer. A SISO measurement tool 107, such as the Hewlett Packard HP 3563A, is connected to the feedback loop 101 for measuring frequency response functions. The SISO measurement tool 107 is connected to the computer 105 through a HP-IB IEEE 488 bus and card 109. This bus connection allows commands and data to flow in both directions between the computer 105 and the SISO measuring tool 107. The SISO measurement tool 107 is optionally connected to a Banshee card 111 that allows for direct digital measurement of frequency response functions of the MIMO feedback loop 101. A CAD program or mathematics module 113, such as Matlab from The Mathworks, or Control-C from Systems Control Technology of Palo Alto, California, or Matrix X from Integrated Systems, Inc. of Santa Clara, Calif., is installed on the computer 105 and is used for analysis and design. A menu-driven interface program, contained in the MWS 91, acts as the "glue" to allow the other software and hardware items to work together. The interface program controls and shares data with both the SISO measurement tool 107 and the MWS 91. These data can be passed to and received from the CAD program. The Second Configuration feedback loop 101 shown in FIG. 6 can be replaced by a First Configuration feedback loop or by a Third Configuration feedback loop, with suitable changes being made in the connections for the SISO measurement tool 107 and suitable changes being made in the equations analyzed by the CAD or math module 113.

In FIG. 6, the HP 3563A that serves as the SISO measurement tool 107 can be replaced by several other instruments, such as the Bruel & Kj r. 3550 The ASPI Banshee board may be replaced by another DSP board, such as the Cheetah from ASPI of Atlanta, Georgia, a board from Ariel of Highland Park, New Jersey or a board from Spectrum Signal Processing of Blaine, Washington. The Matlab mathematics module can be replaced by the Matrix X program offered by Integrated Systems, Inc. of Santa Clara, Calif., or by the Control-C program offered by Systems Control Technology of Palo Alto, Calif.

FIG. 7 illustrates conceptually how these modules work together in a preferred embodiment. Acting by itself, the SISO measurement tool 107 is capable of making both analog and digital measurements of a SISO control system. However, when the SISO tool 107 is pan of the MWS 91 in FIG. 6, the SISO tool 107 can also perform a sequence of SISO measurements on a SIMO, MISO or MIMO control system. The individual SISO closed-loop frequency response functions are measured and passed to the math module 113 through the interface program so that the appropriate frequency response function or matrix entries of the matrix T or S or V or W or $T_i$ or $S_i$ or $T_{ij}$ or $S_{ij}$ can be assembled.. In a similar manner, the individual SISO open-loop frequency response functions of the compensator module 93 shown in FIG. 6 can be measured and passed to the math module 113 through the interface program so that the compensator frequency response matrix entries can be assembled. Determination of the MIMO loop unwrapping equations is performed in the math module 113. The final result is the frequency response function matrix entries describing the open-loop physical system or plant module 95. The frequency response functions that are entries in the plant module matrix P can either be fit to a single MIMO transfer function in the math module 113, or these frequency response functions can be passed to the SISO measurement tool 107 for curve fitting of the individual transfer functions. The transfer functions are then passed back to the math. module 113 and assembled into a single MIMO transfer function for state space implementation.

The math module 113 in FIG. 6 is used to perform the matrix waveform mathematical manipulation because the SISO measurement tool 107 is limited to performing scalar waveform mathematics. The interface program between the SISO tool 107 and the computer 105 allows direct digital measurements to be made on the control system. The interface program controls performance of these measurements by determining (1) which SISO parameters are to be used by the SISO tool 107 and (2) which signals should be transferred between the SISO tool 107 and the computer 105.

I claim:

1. Apparatus for determining open-loop parameters for a First Configuration, multiple-input, multiple output, closed-loop control system, the apparatus comprising:

a feedback loop having a difference module, a controller module, a plant module and a sensor module arranged in that order in a feedback loop that operates in its linear operating region, the sensor module having sensor dynamics represented by a matrix H of dimensions $n_1 \times n_2$, the controller module having controller dynamics represented by a matrix C of dimensions $n_3 \times n_1$, and the plant module having physical system dynamics represented by a matrix P of dimensions $n_2 \times n_3$, where $n_1$, $n_2$ and $n_3$ are selected positive integers;

the difference module having a first input terminal that receives an array R of $n_1$ predetermined input signals, having a second input terminal that receives an array Z of $n_1$ input signals, and having an output terminal, where the difference module forms and issues at its output terminal a difference signal array $E = R - Z$;

the controller module receiving the vector array E of signals at an input terminal thereof and, in response thereto, forming and issuing an array $U = CE$ of $n_3$ intermediate output signals at an output terminal thereof;

the plant module receiving the vector array U of signals at an input terminal thereof and, in response thereto, forming and issuing an array $Y=PU$ of $n_2$ output signals at an output terminal thereof;

the sensor module receiving the vector array Y of signals at an input terminal thereof and, in response thereto, forming and issuing an array $Z=HY$ of $n_1$ signals at an output terminal thereof;

measurement means connected to the feedback loop for measuring the array Z of signals received in response to provision of the array R of $n_1$ signals; and computation means for receiving measurements of the array Z of $n_1$ signals from the measurement means, for determining the entries of a matrix T, of dimensions $n_1 \times n_1$ and representing the closed loop response of the feedback loop, by solving the matrix identity $Z=TR$, for forming a quasi-inverse matrix $(I-T)$ , for determining the entries of a matrix HPC or HP.

2. The apparatus of claim 1, wherein said measurement means and said computation means comprise:

a control system signal analyzer, connected to said feedback loop, that injects said array of signals R and measures said array of signals Z and said array of signals R to form said matrix T; and a multivariable work station, including a digital computer, a digital signal processor, a mathematics module and an interface between the control system signal analyzer and the remainder of the multivariable work station, that receives and temporarily stores said arrays of signals R and Z as measured by the control system signal analyzer, and that determines the entries of said matrices T and $(I-T)^{\dagger}$, the entries of said matrix $C^{\dagger}$, and the entries of said matrix HP by the relation $HP=(I-T)^{\dagger}TC^{\dagger}=T(I-T)^{\dagger}C^{\dagger}$.

3. Apparatus for determining open-loop parameters for a First Configuration, multiple-input, multiple output, closed-loop control system, the apparatus comprising:

a feedback loop having a difference module, a controller module, a plant module and a sensor module arranged in that order in a feedback loop that operates in its linear operating region, the sensor module having sensor dynamics represented by a matrix H of dimensions $n_1 \times n_2$, the controller module having controller dynamics represented by a matrix C of dimensions $n_3 \times n_1$, and the plant module having physical system dynamics represented by a matrix P of dimensions $n_2 \times n_3$, where $n_1$, $n_2$ and $n_3$ are selected positive integers;

the difference module having a first input terminal that receives an array R of $n_1$ predetermined input signals, having a second input terminal that receives an array Z of $n_1$ input signals, and having an output terminal, where the difference module forms and issues at its output terminal a difference signal array $E=R-Z$;

the controller module receiving the vector array E of signals at an input terminal thereof and, in response thereto, forming and issuing an array $U=CE$ of $n_3$ intermediate output signals at an output terminal thereof;

the plant module receiving the vector array U of signals at an input terminal thereof and, in response thereto, forming and issuing an array $Y=PU$ of $n_2$ output signals at an output terminal thereof;

the sensor module receiving the vector array Y of signals at an input terminal thereof and, in response thereto, forming and issuing an array $Z=HY$ of $n_1$ signals at an output terminal thereof;

measurement means connected to the feedback loop for measuring the array E of signals received in response to provision of the array R of $n_1$ signals; and computation means for receiving measurements of the array E of $n_1$ signals from the measurement means, for determining the entries of a matrix S of dimensions $n_1 \times n_1$ by solving the matrix identity $E=SR$, for forming a quasi-inverse $C^{\dagger}$ of the matrix C and a quasi-inverse matrix $S^{\dagger}$ of the matrix S, and for determining the entries of a matrix HP or HPC.

4. The apparatus of claim 3, wherein said measurement means and said computation means comprise:

a control system signal analyzer, connected to said feedback loop, that injects said array of signals R and measures said array of signals E and said array of signals R to form said matrix S; and a multivariable work station, including a digital computer, a digital signal processor, a mathematics module and an interface between the control system signal analyzer and the remainder of the multivariable work station, that receives and temporarily stores said arrays of signals R and E as measured by the control system signal analyzer, and that determines the entries of said matrices $S^{\dagger}$, the entries of said matrix $C^{\dagger}$, and the entries of said matrix HP by the relation $HP=(S^{\dagger}-I)C^{\dagger}$.

5. Apparatus for determining open-loop parameters for a First Configuration, multiple-input, multiple output, closed-loop control system, the apparatus comprising:

a feedback loop having a difference module, a controller module, a plant module and a sensor module arranged in that order in a feedback loop that operates in its linear operating region, the sensor module having sensor dynamics represented by a matrix H of dimensions $n_1 \times n_2$, the controller module having controller dynamics represented by a matrix C of dimensions $n_3 \times n_1$, and the plant module having physical system dynamics represented by a matrix P of dimensions $n_2 \times n_3$, where $n_1$, $n_2$ and $n_3$ are selected positive integers;

the difference module having a first input terminal that receives an array R of $n_1$ predetermined input signals, having a second input terminal that receives an array Z of $n_1$ input signals, and having an output terminal, where the difference module forms and issues at its output terminal a difference signal array $E=R-Z$;

the controller module receiving the vector array E of signals at an input terminal thereof and, in response thereto, forming and issuing an array $U=CE$ of $n_3$ intermediate output signals at an output terminal thereof;

the plant module receiving the vector array U of signals at an input terminal thereof and, in response thereto, forming and issuing an array $Y=PU$ of $n_2$ output signals at an output terminal thereof;

the sensor module receiving the vector array Y of signals at an input terminal thereof and, in response thereto, forming and issuing an array Z=HY of $n_1$ signals at an output terminal thereof;

measurement means connected to the feedback loop for measuring the array U of signals received in response to provision of the array R of $n_1$ signals; and computation means for receiving measurements of the array U of $n_3$ signals from the measurement means, for determining the entries of a matrix V of dimensions $n_3 \times n_1$ by solving the matrix identity U=VR, for forming a quasi-inverse $C^\dagger$ of the matrix C and a quasi-inverse $(C^\dagger V)^\dagger$ of the matrix $C^\dagger V$, and for determining the entries of a matrix HP or HPC or CHP.

6. The apparatus of claim 5, wherein said measurement means and said computation means comprise:

a control system signal analyzer, connected to said feedback loop, that injects said array of signals R and measures said array of signals U and said array of signals R to form said matrix V; and a multivariable work station, including a digital computer, a digital signal processor, a mathematics module and an interface between the control system signal analyzer and the remainder of the multivariable work station, that receives and temporarily stores said arrays of signals R and U as measured by the control system signal analyzer, and that determines the entries of said matrix $C^\dagger$, the entries of said matrix $((VC^\dagger)^\dagger$, and the entries of said matrix HP by the relation $HP=C^\dagger[(VC^\dagger)^\dagger - I]$ $= [(C^\dagger V)^\dagger - I]C^\dagger$.

7. Apparatus for determining open-loop parameters for a First Configuration, multiple-input, multiple output, closed-loop control system, the apparatus comprising:

a feedback loop having a difference module, a controller module, a plant module and a sensor module arranged in that order in a feedback loop that operates in its linear operating region, the sensor module having sensor dynamics represented by a matrix H of dimensions $n_1 \times n_2$, the controller module having controller dynamics represented by a matrix C of dimensions $n_3 \times n_1$, and the plant module having physical system dynamics represented by a matrix P of dimensions $n_2 \times n_3$, where $n_1$, $n_2$ and $n_3$ are selected positive integers;

the difference module having a first input terminal that receives an array R of $n_1$ predetermined input signals, having a second input terminal that receives an array Z of $n_1$ input signals, and having an output terminal, where the difference module forms and issues at its output terminal a difference signal array E=R−Z;

the controller module receiving the vector array E of signals at an input terminal thereof and, in response thereto, forming and issuing an array U=CE of $n_3$ intermediate output signals at an output terminal thereof;

the plant module receiving the vector array U of signals at an input terminal thereof and, in response thereto, forming and issuing an array Y=PU of $n_2$ output signals at an output terminal thereof;

the sensor module receiving the vector array Y of signals at an input terminal thereof and, in response thereto, forming and issuing an array Z=HY of $n_1$ signals at an output terminal thereof;

measurement means connected to the feedback loop for measuring the array Y of signals received in response to provision of the array R of $n_1$ signals; and computation means for receiving measurements of the array Y of $n_2$ signals from the measurement means, for determining the entries of a matrix W of dimensions $n_2 \times n_1$ by solving the matrix identity Y=WR, for forming a quasi-inverse $C^\dagger$ of the matrix C and a quasi-inverse $(I-HW)^\dagger$ of the matrix I-HW, and for determining the entries of a matrix HP or HPC.

8. The apparatus of claim 7, wherein said measurement means and said computation means comprise:

a control system signal analyzer, connected to said feedback loop, that injects said array of signals R and measures said array of signals Y and said array of signals R to form said matrix W; and a multivariable work station, including a digital computer, a digital signal processor, a mathematics module and an interface between the control system signal analyzer and the remainder of the multivariable work station, that receives and temporarily stores said arrays of signals R and Y as measured by the control system signal analyzer, and that determines the entries of said matrices HW and $(I-HW)^\dagger$, the entries of said matrix $C^\dagger$, and the entries of said matrix HP by the relation $HP=HW(I-HW)^\dagger C^\dagger$.

9. Apparatus for determining open-loop parameters for a Second Configuration, multiple-input, multiple output, closed-loop control system, the apparatus comprising:

a feedback loop having a difference module, a controller module, a sum module and a plant module arranged in that order in a feedback loop that operates in its linear operating region, the controller module having controller dynamics represented by a matrix C of dimensions $n_2 \times n_1$, and the plant module having physical system dynamics represented by a matrix P of dimensions $n_1 \times n_2$, where $n_1$ and $n_2$ are predetermined positive integers;

the difference module having a first input terminal that receives an array $R_1$ of $n_1$ predetermined input signals and having a second input terminal that receives an array $Y_2$ of signals, with the difference module forming and issuing at an output terminal thereof a difference array of signals $E_1 = R_1 - Y_2$;

the controller module receiving the array $E_l$ at an input terminal thereof and, in response thereto, forming and issuing an array $Y_1 = CE_1$ of $n_2$ intermediate output signals at an output terminal thereof;

the sum module having a first input terminal to receive an array $R_2$ of $n_2$ predetermined input signals and having a second input terminal to receive the array $Y_1$ of intermediate output signals, with the sum module forming and issuing a sum array of signals $E_2 = R_2 + Y_1$;

the plant module receiving the vector array of signals $E_2$ at an input terminal thereof and, in response thereto, forming and issuing an array $Y_2 = PE_2$ of $n_1$ output signals at an output terminal thereof;

measurement means connected to the feedback loop for measuring the arrays $Y_1$ and $Y_2$ of signals received in response to provision of the arrays $R_1$ and $R_2$ of signals; and computation means for receiving measurements of the arrays $Y_1$ and $Y_2$ of signals from the measurement means, for determining the entries of at least one of the matrices $T=T_1$, $T_2$, $T_3$ and $T_4$ of dimensions $n_2 \times n_1$, $n_2 \times n_2$, $n_1 \times n_1$ and $n_1 \times n_2$, respectively, by solving the matrix identity $$\begin{bmatrix} Y_1 \\ Y_2 \end{bmatrix} = \begin{bmatrix} T_1 & T_2 \\ T_3 & T_4 \end{bmatrix} \begin{bmatrix} R_1 \\ R_2 \end{bmatrix}$$

for these entries, and for determining the entries of P or PC or CP from the entries of the matrix T.

10. The apparatus of claim 9, wherein $T=T_1$ and said measurement means and said computation means comprise:
- a signal analyzer connected to said feedback loop that measures said arrays of signals $R_1$, $R_2$, $Y_1$ and $Y_2$; and
- a multivariable work station, including a digital computer, a digital signal processor and associated mathematics module, that receives and temporarily stores said arrays of signals $R_1$, $R_2$, $Y_1$ and $Y_2$ as measured by the signal analyzer, and that determines the entries of said matrices $T_1$ and $T_1^\dagger$, the entries of said matrix $C^\dagger$, and the entries of said matrix P by the relation $P=T_1^\dagger - C^\dagger$.

11. The apparatus of claim 9, wherein $T=T_2$ and said measurement means and said computation means comprise:
- a signal analyzer connected to said feedback loop that measures said arrays of signals $R_1$, $R_2$, $Y_1$ and $Y_2$; and
- a multivariable work station, including a digital computer, a digital signal processor and associated mathematics module, that receives and temporarily stores said arrays of signals $R_1$, $R_2$, $Y_1$ and $Y_2$ as measured by the signal analyzer, and that determines the entries of said matrices $T_2$ and $(I+T_2)^\dagger$, the entries of said matrix $C^\dagger$, and the entries of said matrix P by the relation $P=-C^\dagger T_2(I+T_2)^\dagger = -C^\dagger (I+T_2)^\dagger T_2$.

12. The apparatus of claim 9, wherein $T=T_3$ and said measurement means and said computation means comprise:
- a signal analyzer connected to said feedback loop that measures said arrays of signals $R_1$, $R_2$, $Y_1$ and $Y_2$; and
- a multivariable work station, including a digital computer, a digital signal processor and associated mathematics module, that receives and temporarily stores said arrays of signals $R_1$, $R_2$, $Y_1$ and $Y_2$ as measured by the signal analyzer, and that determines the entries of said matrices $T_3$ and $(I-T_3)^\dagger$, the entries of said matrix $C^\dagger$, and the entries of said matrix P by the relation $P=T_3(I-T_3)^\dagger C^\dagger = (I-T_3)^\dagger T_3 C^\dagger$.

13. The apparatus of claim 9, wherein $T=T_4$ and said measurement means and said computation means comprise:
- a signal analyzer connected to said feedback loop that measures said arrays of signals $R_1$, $R_2$, $Y_1$ and $Y_2$; and
- a multivariable work station, including a digital computer, a digital signal processor and associated mathematics module, that receives and temporarily stores said arrays of signals $R_1$, $R_2$, $Y_1$ and $Y_2$ as measured by the signal analyzer, and that determines the entries of said matrices $T_4$ and $(I-CT_4)^\dagger$, the entries of said matrix $C^\dagger$, and the entries of said matrix P by the relation $P=T_4(I-CT_4)^\dagger = (I-T_4C)^\dagger T_4$.

14. Apparatus for determining open-loop parameters for a Second Configuration, multiple-input, multiple output, closed-loop control system, the apparatus comprising:
- a feedback loop having a difference module, a controller module, a sum module and a plant module arranged in that order in a feedback loop that operates in its linear operating region, the controller module having controller dynamics represented by a matrix C of dimensions $n_2 \times n_1$, and the plant module having physical system dynamics represented by a matrix P of dimensions $n_1 \times n_2$, where $n_1$ and $n_2$ are predetermined positive integers;
- the difference module having a first input terminal that receives an array $R_1$ of $n_1$ predetermined input signals and having a second input terminal that receives an array $Y_2$ of $n_1$ signals, with the difference module forming and issuing at an output terminal thereof a difference array of signals $E_1=R_1-Y_2$;
- the controller module receiving the array $E_1$ at an input terminal thereof and, in response thereto, forming and issuing an array $Y_1=CE_1$ of $n_2$ intermediate output signals at an output terminal thereof;
- the sum module having a first input terminal to receive an array $R_2$ of $n_2$ predetermined input signals and having a second input terminal to receive the array $Y_1$ of intermediate output signals, with the sum module forming and issuing a sum array of signals $E_2=R_2+Y_1$;
- the plant module receiving the array of signals $E_2$ at an input terminal thereof and, in response thereto, forming and issuing an array $Y_2=PE_2$ of $n_1$ output signals at an output terminal thereof;
- measurement means connected to the feedback loop for measuring the arrays $E_1$ and $E_2$ of signals received in response to provision of the arrays $R_1$ and $R_2$ of signals; and
- computation means for receiving measurements of the arrays $E_1$ and $E_2$ of signals from the measurement means, for determining the entries of at least one of the matrices $S=S_1$, $S_2$, $S_3$ and $S_4$ of dimensions $n_1 \times n_1$, $n_1 \times n_2$, $n_2 \times n_1$ and $n_2 \times n_2$, respectively, by solving the matrix identity $$\begin{bmatrix} E_1 \\ E_2 \end{bmatrix} = \begin{bmatrix} S_1 & S_2 \\ S_3 & S_4 \end{bmatrix} \begin{bmatrix} R_1 \\ R_2 \end{bmatrix}$$

for these entries, and for determining the entries of P or CP or PC from the entries of the matrix S.

15. The apparatus of claim 14, wherein $S=S_1$ and said measurement means and said computation means comprise:
- a signal analyzer connected to said feedback loop that measures said arrays of signals $R_1$, $R_2$, $E_1$ and $E_2$; and
- a multivariable work station, including a digital computer, a digital signal processor and associated mathematics module, that receives and temporarily stores said arrays of signals $R_1$, $R_2$, $E_1$ and $E_2$ as measured by the signal analyzer, and that determines the entries of said matrices $S_1$ and $S_1^\dagger$, the entries of said matrix $C^\dagger$, and the entries of said matrix P by the relation $P=(S_1^\dagger - I)C^\dagger$.

16. The apparatus of claim 14, wherein $S=S_2$ and said measurement means and said computation means comprise:
- a signal analyzer connected to said feedback loop that measures said arrays of signals $R_1$, $R_2$, $E_1$ and $E_2$; and
- a multivariable work station, including a digital computer, a digital signal processor and associated mathematics module, that receives and temporarily stores said arrays of signals $R_1$, $R_2$, $E_1$ and $E_2$ as measured by the signal analyzer, and that determines the entries of said matrices $S_2$ and $(I+CS_2)^\dagger$, the entries of said matrix $C^\dagger$, and the entries of said matrix $P$ by the relation $P=-S_2(I+CS_2)^\dagger = -(I+S_2C)^\dagger S_2$.

17. The apparatus of claim 14, wherein $S=S_3$ and said measurement means and said computation means comprise:
- a signal analyzer connected to said feedback loop that measures said arrays of signals $R_1$, $R_2$, $E_1$ and $E_2$; and
- a multivariable work station, including a digital computer, a digital signal processor and associated mathematics module, that receives and temporarily stores said arrays of signals $R_1$, $R_2$, $E_1$ and $E_2$ as measured by the signal analyzer, and that determines the entries of said matrices $S_3$ and $S_3^\dagger$, the entries of said matrix $C^\dagger$, and the entries of said matrix $P$ by the relation $P=S_3^\dagger - C^\dagger$.

18. The apparatus of claim 14, wherein $S=S_4$ and said measurement means and said computation means comprise:
- a signal analyzer connected to said feedback loop that measures said arrays of signals $R_1$, $R_2$, $E_1$ and $E_2$; and
- a multivariable work station, including a digital computer, a digital signal processor and associated mathematics module, that receives and temporarily stores said arrays of signals $R_1$, $R_2$, $E_1$ and $E_2$ as measured by the signal analyzer, and that determines the entries of said matrices $S_4$ and $S_4^\dagger$, the entries of said matrix $C^\dagger$, and the entries of said matrix $P$ by the relation $P=C^\dagger(S_4^\dagger - I)$.

19. Apparatus for determining open-loop parameters for a Third Configuration, multiple-input, multiple output, closed-loop control system, the apparatus comprising:
- a feedback loop having a difference module, a controller module, a first sum module a plant module, a second sum module and a sensor module arranged in that order in a feedback loop that operates in its linear operating region, the controller module having controller dynamics represented by a matrix $C$ of dimensions $n_2 \times n_1$, the plant module having physical system dynamics represented by a matrix $P$ of dimensions $n_3 \times n_2$, and the sensor module having sensor dynamics represented by a matrix $H$ of dimensions $n_1 \times n_3$, where $n_1$, $n_2$ and $n_3$ are predetermined positive integers;
- the difference module having a first input terminal that receives an array $R_1$ of $n_1$ predetermined input signals and having a second input terminal that receives an array $Y_3$ of $n_1$ signals, with the difference module forming and issuing at an output terminal thereof a difference array of signals $E_1 = R_1 - Y_3$;
- the controller module receiving the array $E_1$ at an input terminal thereof and, in response thereto, forming and issuing an array $Y_1 = CE_1$ of $n_2$ intermediate output signals at an output terminal thereof;
- the first sum module having a first input terminal to receive an array $R_2$ of $n_2$ predetermined input signals and having a second input terminal to receive the array $Y_1$ of intermediate output signals, with the sum module forming and issuing a sum array of signals $E_2 = R_2 + Y_1$;
- the plant module receiving the array of signals $E_2$ at an input terminal thereof and, in response thereto, forming and issuing an array $Y_2 = PE_2$ of $n_3$ output signals at an output terminal thereof;
- the second sum module having a first input terminal to receive an array $R_3$ of $n_3$ predetermined input signals and having a second input terminal to receive the array $Y_2$ of intermediate output signals, with the sum module forming and issuing a sum array of signals $E_3 = R_3 + Y_2$;
- the sensor module receiving the array of signals $E_3$ at an input terminal thereof and, in response thereto, forming and issuing an array $Y_3 = HE_3$ of $n_1$ output signals at an output terminal thereof;
- measurement means connected to the feedback loop for measuring the arrays $E_1$, $E_2$ and $E_3$ of signals received in response to provision of signal arrays $R_1$, $R_2$ and $R_3$; and
- computation means for receiving measurements of the arrays $E_1$, $E_2$ and $E_3$ of signals from the measurement means, for determining the entries of at least one of the matrices $S=S_{11}$, $S_{12}$, $S_{13}$, $S_{21}$, $S_{22}$, $S_{23}$, $S_{31}$, $S_{32}$ and $S_{33}$ of dimensions $n_1 \times n_1$, $n_1 \times n_2$, $n_1 \times n_3$, $n_2 \times n_1$, $n_2 \times n_2$, $n_2 \times n_3$, $n_3 \times n_1$, $n_3 \times n_2$ and $n_3 \times n_3$, respectively, by solving the matrix identity $$\begin{bmatrix} E_1 \\ E_2 \\ E_3 \end{bmatrix} = \begin{bmatrix} S_{11} & S_{12} & S_{13} \\ S_{21} & S_{22} & S_{23} \\ S_{31} & S_{32} & S_{33} \end{bmatrix} \begin{bmatrix} R_1 \\ R_2 \\ R_3 \end{bmatrix}$$

for these entries, and for determining the entries of $P$ or $HP$ or $CHP$ or $PCH$ or $HCP$ from the entries of the matrix $S$.

20. The apparatus of claim 19, wherein $S=S_{11}$ and said measurement means and said computation means comprise:
- a signal analyzer connected to said feedback loop that measures said arrays of signals $R_1$, $R_2$, $R_3$, $E_1$, $E_2$ and $E_3$; and
- a multivariable work station, including a digital computer, a digital signal processor and associated mathematics module, that receives and temporarily stores said arrays of signals $R_1$, $R_2$, $R_3$, $E_1$, $E_2$ and $E_3$ as measured by the signal analyzer, and that determines the entries of said matrices $S_{11}$ and $S_{11}^\dagger$, the entries of said matrix $C^\dagger$, and the entries of said matrix $HP$ by the relation $HP=(S_{11}^\dagger - I)C^\dagger$.

21. The apparatus of claim 19, wherein $S=S_{12}$ and said measurement means and said computation means comprise:
- a signal analyzer connected to said feedback loop that measures said arrays of signals $R_1$, $R_2$, $R_3$, $E_1$, $E_2$ and $E_3$; and
- a multivariable work station, including a digital computer, a digital signal processor and associated mathematics module, that receives and temporarily stores said arrays of signals $R_1, R_2, R_3, E_1, E_2$ and $E_3$ as measured by the signal analyzer, and that determines the entries of said matrices $S_{12}$ and $(I+CS_{12})^\dagger$, the entries of said matrix $C^\dagger$, and the entries of said matrix HP by the relation $HP = -S_{12}(I+CS_{12})^\dagger = -(I+S_{12}C)^\dagger S_{12}$.

22. The apparatus of claim 19, wherein $S=S_{13}$ and said measurement means and said computation means comprise:
- a signal analyzer connected to said feedback loop that measures said arrays of signals $R_1, R_2, R_3, E_1, E_2$ and $E_3$; and
- a multivariable work station, including a digital computer, a digital signal processor and associated mathematics module, that receives and temporarily stores said arrays of signals $R_1, R_2, R_3, E_1, E_2$ and $E_3$ as measured by the signal analyzer, and that determines the entries of said matrices $S_{13}$ and $HS_{13}^\dagger$, the entries of said matric $C^\dagger$, and the entries of said matrix HP by the relation $HP = -(I+HS_{13}^\dagger)C^\dagger$.

23. The apparatus of claim 19, wherein $S=S_{21}$ and said measurement means and said computation means comprise:
- a signal analyzer connected to said feedback loop that measures said arrays of signals $R_1, R_2, R_3, E_1, E_2$ and $E_3$; and
- a multivariable work station, including a digital computer, a digital signal processor and associated mathematics module, that receives and temporarily stores said arrays of signals $R_1, R_2, R_3, E_1, E_2$ and $E_3$ as measured by the signal analyzer, and that determines the entries of said matrices $S_{21}$ and $S_{21}^\dagger$, the entries of said matrix $C^\dagger$, and the entries of said matrix HP by the relation $HP=S_{21}^\dagger - C^\dagger$.

24. The apparatus of claim 19, wherein $S=S_{22}$ and said measurement means and said computation means comprise:
- a signal analyzer connected to said feedback loop that measures said arrays of signals $R_1, R_2, R_3, E_1, E_2$ and $E_3$; and
- a multivariable work station, including a digital computer, a digital signal processor and associated mathematics module, that receives and temporarily stores said arrays of signals $R_1, R_2, R_3, E_1, E_2$ and $E_3$ as measured by the signal analyzer, and that determines the entries of said matrices $S_{22}$ and $S_{22}^\dagger$, the entries of said matrix $C^\dagger$, and the entries of said matrix HP by the relation $HP = C^\dagger(S_{22}^\dagger - I)$.

25. The apparatus of claim 19, wherein $S=S_{23}$ and said measurement means and said computation means comprise:
- a signal analyzer connected to said feedback loop that measures said arrays of signals $R_1, R_2, R_3, E_1, E_2$ and $E_3$; and
- a multivariable work station, including a digital computer, a digital signal processor and associated mathematics module, that receives and temporarily stores said arrays of signals $R_1, R_2, R_3, E_1, E_2$ and $E_3$ as measured by the signal analyzer, and that determines the entries of said matrices $S_{23}$ and $S_{23}^\dagger$, the entries of said matrix $(CH)^\dagger$, and the entries of said matrix P by the relation $P = -S_{23}^\dagger - (CH)^\dagger$.

26. The apparatus of claim 19, wherein $S=S_{31}$ and said measurement means and said computation means comprise:
- a signal analyzer connected to said feedback loop that measures said arrays of signals $R_1, R_2, R_3, E_1, E_2$ and $E_3$; and
- a multivariable work station, including a digital computer, a digital signal processor and associated mathematics module, that receives and temporarily stores said arrays of signals $R_1, R_2, R_3, E_1, E_2$ and $E_3$ as measured by the signal analyzer, and that determines the entries of said matrices $S_{31}$ and $(I-HS_{31})^\dagger$ or $(I-S_{31}H)^\dagger$, the entries of said matrix $C^\dagger$, and the entries of said matrix P by the relation $P = (I-S_{31}H)^\dagger S_{31}C^\dagger = S_{31}(I-HS_{31})^\dagger C^\dagger$.

27. The apparatus of claim 19, wherein $S=S_{32}$ and said measurement means and said computation means comprise:
- a signal analyzer connected to said feedback loop that measures said arrays of signals $R_1, R_2, R_3, E_1, E_2$ and $E_3$; and
- a multivariable work station, including a digital computer, a digital signal processor and associated mathematics module, that receives and temporarily stores said arrays of signals $R_1, R_2, R_3, E_1, E_2$ and $E_3$ as measured by the signal analyzer, and that determines the entries of said matrices $S_{32}$ and $(I-S_{32}CH)^\dagger$ or $(I-CHS_{32})^\dagger$, the entries of said matrix $C^\dagger$, and the entries of said matrix P by the relation $P = (I-S_{32}CH)^\dagger S_{32} = S_{32}(I-CHS_{32})^\dagger$.

28. The apparatus of claim 19, wherein $S=S_{33}$ and said measurement means and said computation means comprise:
- a signal analyzer connected to said feedback loop that measures said arrays of signals $R_1, R_2, R_3, E_1, E_2$ and $E_3$; and
- a multivariable work station, including a digital computer, a digital signal processor and associated mathematics module, that receives and temporarily stores said arrays of signals $R_1, R_2, R_3, E_1, E_2$ and $E_3$ as measured by the signal analyzer, and that determines the entries of said matrices $S_{33}$ and $S_{33}^\dagger$, the entries of said matrix $(CH)^\dagger$, and the entries of said matrix P by the relation $P = (S_{33}^\dagger - I)(CH)^\dagger$.

29. Apparatus for determining open-loop parameters for a Third Configuration, multiple-input, multiple output, closed-loop control system, the apparatus comprising:
- a feedback loop having a difference module, a controller module, a first sum module a plant module, a second sum module and a sensor module arranged in that order in a feedback loop that operates in its linear operating region, the controller module having controller dynamics represented by a matrix C of dimensions $n_2 \times n_1$, the plant module having physical system dynamics represented by a matrix P of dimensions $n_3 \times n_2$, and the sensor module having sensor dynamics represented by a matrix H of dimensions $n_1 \times n_3$, where $n_1$, $n_2$ and $n_3$ are predetermined positive integers;
- the difference module having a first input terminal that receives an array $R_1$ of $n_1$ predetermined input signals and having a second input terminal that receives an array $Y_3$ of $n_1$ signals, with the difference module forming and issuing at an output terminal thereof a difference array of signals $E_1 = R_1 - Y_3$;
- the controller module receiving the array $E_1$ at an input terminal thereof and, in response thereto, forming and issuing an array $Y_1 = CE_1$ of $n_2$ intermediate output signals at an output terminal thereof;

the first sum module having a first input terminal to receive an array $R_2$ of $n_2$ predetermined input signals and having a second input terminal to receive the array $Y_1$ of intermediate output signals, with the sum module forming and issuing a sum array of signals $E_2 = R_2 + Y_1$;

the plant module receiving the array of signals $E_2$ at an input terminal thereof and, in response thereto, forming and issuing an array $Y_2 = PE_2$ of $n_3$ output signals at an output terminal thereof;

the second sum module having a first input terminal to receive an array $R_3$ of $n_3$ predetermined input signals and having a second input terminal to receive the array $Y_2$ of intermediate output signals, with the sum module forming and issuing a sum array of signals $E_3 = R_3 + Y_2$;

the sensor module receiving the array of signals $E_3$ at an input terminal thereof and, in response thereto, forming and issuing an array $Y_3 = HE_3$ of $n_1$ output signals at an output terminal thereof;

measurement means connected to the feedback loop for measuring the arrays $E_1$, $E_2$ and $E_3$ of signals received in reponse to provision of signal arrays $R_1$, $R_2$ and $R_3$; and computation means for receiving measurements of the arrays $Y_1$, $Y_2$ and $Y_3$ of signals from the measurement means, for determining the entries of at least one of the matrices $T = T_{11}$, $T_{12}$, $T_{13}$, $T_{21}$, $T_{22}$, $T_{23}$, $T_{31}$, $T_{32}$ and $T_{33}$ of dimensions $n_2 \times n_1$, $n_2 \times n_2$, $n_2 \times n_3$, $n_3 \times n_1$, $n_3 \times n_2$, $n_3 \times n_3$, $n_1 \times n_1$, $n_1 \times n_2$ and $n_1 \times n_3$, respectively, by solving the matrix identity $$\begin{bmatrix} Y_1 \\ Y_2 \\ Y_3 \end{bmatrix} = \begin{bmatrix} T_{11} & T_{12} & T_{13} \\ T_{21} & T_{22} & T_{23} \\ T_{31} & T_{32} & T_{33} \end{bmatrix} \begin{bmatrix} R_1 \\ R_2 \\ R_3 \end{bmatrix}$$

for these entries, and for determining the entries of P or HP or or HPC or CHP or PCH from the entries of the matrix T.

30. The apparatus of claim 29, wherein $T = T_{11}$ and said measurement means and said computation means comprise:

a signal analyzer connected to said feedback loop that measures said arrays of signals $R_1$, $R_2$, $R_3$, $Y_1$, $Y_2$ and $Y_3$; and a multivariable work station, including a digital computer, a digital signal processor and associated mathematics module, that receives and temporarily stores said arrays of signals $R_1$, $R_2$, $R_3$, $Y_1$, $Y_2$ and $Y_3$ as measured by the signal analyzer, and that determines the entries of said matrices $T_{11}$ and $T_{11}^\dagger$, the entries of said matrix $C^\dagger$, and the entries of said matrix HP by the relation $HP = T_{11}^\dagger - C^\dagger$.

31. The apparatus of claim 29, wherein $T = T_{12}$ and said measurement means and said computation means comprise:

a signal analyzer connected to said feedback loop that measures said arrays of signals $R_1$, $R_2$, $R_3$, $Y_1$, $Y_2$ and $Y_3$; and a multivariable work station, including a digital computer, a digital signal processor and associated mathematics module, that receives and temporarily stores said arrays of signals $R_1$, $R_2$, $R_3$, $Y_1$, $Y_2$ and $Y_3$ as measured by the signal analyzer, and that that determines the entries of said matrices $T_{12}$ and $(I + T_{12})^\dagger$, the entries of said matrix $C^\dagger$, and the entries of said matrix HP by the relation $HP = -C^\dagger (I + T_{12})^\dagger T_{12} = -C^\dagger T_{12}(I + T_{12})^\dagger$.

32. The apparatus of claim 29, wherein $T = T_{13}$ and said measurement means and said computation means comprise:

a signal analyzer connected to said feedback loop that measures said arrays of signals $R_1$, $R_2$, $R_3$, $Y_1$, $Y_2$ and $Y_3$; and a multivariable work station, including a digital computer, a digital signal processor and associated mathematics module, that receives and temporarily stores said arrays of signals $R_1$, $R_2$, $R_3$, $Y_1$, $Y_2$ and $Y_3$ as measured by the signal analyzer, and that determines the entries of said matrices $T_{13}$ and $T_{13}^\dagger$, the entries of said matrix $(CH)^\dagger$, and the entries of said matrix P by the relation $P = -T_{13}^\dagger (CH)^\dagger$.

33. The apparatus of claim 29, wherein $T = T_{21}$ and said measurement means and said computation means comprise:

a signal analyzer connected to said feedback loop that measures said arrays of signals $R_1$, $R_2$, $R_3$, $Y_1$, $Y_2$ and $Y_3$; and a multivariable work station, including a digital computer, a digital signal processor and associated mathematics module, that receives and temporarily stores said arrays of signals $R_1$, $R_2$, $R_3$, $Y_1$, $Y_2$ and $Y_3$ as measured by the signal analyzer, and that determines the entries of said matrices $T_{21}$ and $(I - T_{21}H)^\dagger$, the entries of said matrix $C^\dagger$, and the entries of said matrix P by the relation $P = (I - T_{21}H)^\dagger T_{21} C^\dagger = T_{21}(I - HT_{21})^\dagger C^\dagger$.

34. The apparatus of claim 29, wherein $T = T_{22}$ and said measurement means and said computation means comprise:

a signal analyzer connected to said feedback loop that measures said arrays of signals $R_1$, $R_2$, $R_3$, $Y_1$, $Y_2$ and $Y_3$; and a multivariable work station, including a digital computer, a digital signal processor and associated mathematics module, that receives and temporarily stores said arrays of signals $R_1$, $R_2$, $R_3$, $Y_1$, $Y_2$ and $Y_3$ as measured by the signal analyzer, and that determines the entries of said matrices $T_{22}$ and $(I - T_{22}CH)^\dagger$, the entries of said matrix $C^\dagger$, and the entries of said matrix P by the relation $P = (I - T_{22}CH)^\dagger T_{22}$.

35. The apparatus of claim 29, wherein $T = T_{23}$ and said measurement means and said computation means comprise:

a signal analyzer connected to said feedback loop that measures said arrays of signals $R_1$, $R_2$, $R_3$, $Y_1$, $Y_2$ and $Y_3$; and a multivariable work station, including a digital computer, a digital signal processor and associated mathematics module, that receives and temporarily stores said arrays of signals $R_1$, $R_2$, $R_3$, $Y_1$, $Y_2$ and $Y_3$ as measured by the signal analyzer, and that determines the entries of said matrices $T_{23}$ and $(I + T_{23})^\dagger$, the entries of said matrix $(CH)^\dagger$, and the entries of said matrix P by the relation $P = -(I + T_{23})^\dagger T_{23}(CH)^\dagger$.

36. The apparatus of claim 29, wherein $T = T_{31}$ and said measurement means and said computation means comprise:

a signal analyzer connected to said feedback loop that measures said arrays of signals $R_1$, $R_2$, $R_3$, $Y_1$, $Y_2$ and $Y_3$; and a multivariable work station, including a digital computer, a digital signal processor and associated mathematics module, that receives and temporarily stores said arrays of signals $R_1$, $R_2$, $R_3$, $Y_1$, $Y_2$ and $Y_3$ as measured by the signal analyzer, and that detemines the entries of said matrices $T_{31}$ and $(I-T_{31})^\dagger$, the entries of said matrix $C^\dagger$, and the entries of said matrix HP by the relation $HP = (I-T_{31})^\dagger T_{31} C^\dagger$.

37. The apparatus of claim 29, wherein $T = T_{32}$ and said measurement means and said computation means comprise:

a signal analyzer connected to said feedback loop that measures said arrays of signals $R_1$, $R_2$, $R_3$, $Y_1$, $Y_2$ and $Y_3$; and a multivariable work station, including a digital computer, a digital signal processor and associated mathematics module, that receives and temporarily stores said arrays of signals $R_1$, $R_2$, $R_3$, $Y_1$, $Y_2$ and $Y_3$ as measured by the signal analyzer, and that determines the entries of said matrices $T_{32}$ and $(I-CT_{32})^\dagger$ and the entries of said matrix HP by the relation $HP = T_{32}(I-CT_{32})^\dagger = (I-T_{32}C)^\dagger T_{32}$.

38. The apparatus of claim 29, wherein $T = T_{33}$ and said measurement means and said computation means comprise:

a signal analyzer connected to said feedback loop that measures said arrays of signals $R_1$, $R_2$, $R_3$, $Y_1$, $Y_2$ and $Y_3$; and a multivariable work station, including a digital computer, a digital signal processor and associated mathematics module, that receives and temporarily stores said arrays of signals $R_1$, $R_2$, $R_3$, $Y_1$, $Y_2$ and $Y_3$ as measured by the signal analyzer, and that determines the entries of said matrices $T_{33}$ and $T_{33}^\dagger$, the entries of said matrices $C^\dagger$ and $H^\dagger$, and the entries of said matrix P by the relation $P = (T_{33}^\dagger - H^\dagger) C^\dagger$.

39. A method for determining open-loop parameters for a First Configuration, multiple-input, multiple output, closed-loop control system, having a difference module, a controller module, a plant module and a sensor module arranged in that order in a feedback loop that operates in its linear operating region, the sensor module having sensor dynamics represented by a matrix H of dimensions $n_1 \times n_2$, the controller module having controller dynamics represented by a matrix C of dimensions $n_3 \times n_1$, and the plant module having physical system dynamics represented by a matrix P of dimensions $n_2 \times n_3$, where $n_1$, $n_2$ and $n_3$ are selected positive integers, the method comprising the steps of:

providing an array R of $n_1$ predetermined input signals that are received at a first input terminal of the difference module;

receiving an array Z of $n_1$ signals at a second input terminal of the difference module;

forming and issuing a difference array $E = R - Z$ of $n_1$ signals at an output terminal of the difference module;

causing the controller module to receive the array E at an input terminal thereof and, in response thereto, to issue an array $U = CE$ of $n_3$ intermediate output signals at an output terminal thereof;

causing the plant module to receive the array U at an input terminal thereof and, in response thereto, to form and issue an array $Y = PU$ of $n_2$ output signals at an output terminal thereof;

causing the sensor module to receive the array Y at an input terminal thereof and, in response thereto, to form and issue the array $Z = HY$ of $n_1$ signals at an output terminal thereof;

providing a control system signal analyzer, connected to the difference module of the feedback loop, that injects the array of signals R, measures the array of signals Z and the array of signals R, and determines the entries of the matrix T of dimensions $n_1 \times n_1$ by solving the matrix identity $Z = TR$;

measuring the array Z of $n_1$ signals received in response to provision of the array R of $n_1$ signals;

determining the entries of the matrix T;

forming a quasi-inverse matrix $(I-T)^\dagger$ of the matrix $(I-T)$ and determining the matrix HPC, having dimensions $n_1 \times n_1$, by the relation $HPC = (I-T)^\dagger T = T(I-T)^\dagger$;

forming a quasi-inverse $C^\dagger$ of the matrix C; and providing a multivariable work station, including a digital computer, a digital signal processor, a mathematics module and an interface between the control system signal analyzer and the remainder of the multivariable work station, connected to the feedback loop, that receives and temporarily stores the arrays of signals R and Z as measured by the control system signal analyzer, and that receives the entries of the matrices T, $(I-T)^\dagger$ and $C^\dagger$ and determines the entries of the matrix HP or HPC.

40. A method for determining open-loop parameters for a First Configuration, multiple-input, multiple output, closed-loop control system, having a difference module, a controller module, a plant module and a sensor module arranged in that order in a feedback loop that operates in its linear operating region, the sensor module having sensor dynamics represented by a matrix H of dimensions $n_1 \times n_2$, the controller module having controller dynamics represented by a matrix C of dimensions $n_3 \times n_1$, and the plant module having physical system dynamics represented by a matrix P of dimensions $n_2 \times n_3$, where $n_1$, $n_2$ and $n_3$ are selected positive integers, the method comprising the steps of:

providing an array R of $n_1$ predetermined input signals that are received at a first input terminal of the difference module;

receiving an array Z of $n_1$ signals at a second input terminal of the difference module;

forming and issuing a difference array $E = R - Z$ of $n_1$ signals at an output terminal of the difference module;

causing the controller module to receive the array E at an input terminal thereof and, in response thereto, to issue an array $U = CE$ of $n_3$ intermediate output signals at an output terminal thereof;

causing the plant module to receive the array U at an input terminal thereof and, in response thereto, to form and issue an array $Y = PU$ of $n_2$ output signals at an output terminal thereof;

causing the sensor module to receive the array Y at an input terminal thereof and, in response thereto, to form and issue the array $Z = HY$ of $n_1$ signals at an output terminal thereof;

providing a control system signal analyzer, connected to the difference module of the feedback loop, that injects the array of signals R, measures the array of signals E and the array of signals R, and determines the entries of the matrix S of dimensions $n_1 \times n_1$ by solving the matrix identity $E=SR$;

measuring the array E of $n_1$ signals received in response to provision of the array R of $n_1$ signals;

determining the entries of the matrix S;

forming a quasi-inverse matrix $S^\dagger$ of the matrix S and determining the matrix HPC, having dimensions $n_1 \times n_1$, by the relation $HPC = S^\dagger - I$;

forming a quasi-inverse $C^\dagger$ of the matrix C; and providing a multivariable work station, including a digital computer, a digital signal processor, a mathematics module and an interface between the control system signal analyzer and the remainder of the multivariable work station, connected to the feedback loop, that receives and temporarily stores the arrays of signals R and E as measured by the control system signal analyzer, and that receives the entries of the matrices, S, $S^\dagger$ and $C^\dagger$ and determines the entries of the matrix HP or HPC.

41. A method for determining open-loop parameters for a First Configuration, multiple-input, multiple output, closed-loop control system, having a difference module, a controller module, a plant module and a sensor module arranged in that order in a feedback loop that operates in its linear operating region, the sensor module having sensor dynamics represented by a matrix H of dimensions $n_1 \times n_2$, the controller module having controller dynamics represented by a matrix C of dimensions $n_3 \times n_1$, and the plant module having physical system dynamics represented by a matrix P of dimensions $n_2 \times n_3$, where $n_1$, $n_2$ and $n_3$ are selected positive integers, the method comprising the steps of:

providing an array R of $n_1$ predetermined input signals that are received at a first input terminal of the difference module;

receiving an array Z of $n_1$ signals at a second input terminal of the difference module;

forming and issuing a difference array $E=R-Z$ of $n_1$ signals at an output terminal of the difference module;

causing the controller module to receive the array E at an input terminal thereof and, in response thereto, to issue an array $U=CE$ of $n_3$ intermediate output signals at an output terminal thereof;

causing the plant module to receive the array U at an input terminal thereof and, in response thereto, to form and issue an array $Y=PU$ of $n_2$ output signals at an output terminal thereof;

causing the sensor module to receive the array Y at an input terminal thereof and, in response thereto, to form and issue the array $Z=HY$ of $n_1$ signals at an output terminal thereof;

providing a control system signal analyzer, connected to the difference module of the feedback loop, that injects the array of signals R, measures the array of signals U and the array of signals R, and determines the entries of the matrix V of dimensions $n_3 \times n_1$ by solving the matrix identity $U=VR$;

measuring the array U of $n_3$ signals received in response to provision of the array R of $n_1$ signals;

determining the entries of the matrix V;

forming a quasi inverse $C^\dagger$ of the matrix C;

forming a quasi-inverse matrix $(C^\dagger V)^\dagger$ of the matrix $C^\dagger V$ and determining the matrix HPC, having dimensions $n_1 \times n_1$, by the relation $HPC = (C^\dagger V)^\dagger - I$; and providing a multivariable work station, including a digital computer, a digital signal processor, a mathematics module and an interface between the control system signal analyzer and the remainder of the multivariable work station, connected to the feedback loop, that receives and temporarily stores the arrays of signals R and U as measured by the control system signal analyzer, and that receives the entries of the matrices V, $(C^\dagger V)^\dagger$ and $C^\dagger$ and determines the entries of the matrix HP or HPC or CHP.

42. A method for determining open-loop parameters for a First Configuration, multiple-input, multiple output, closed-loop control system, having a difference module, a controller module, a plant module and a sensor module arranged in that order in a feedback loop that operates in its linear operating region, the sensor module having sensor dynamics represented by a matrix H of dimensions $n_1 \times n_2$, the controller module having controller dynamics represented by a matrix C of dimensions $n_3 \times n_1$, and the plant module having physical system dynamics represented by a matrix P of dimensions $n_2 \times n_3$, where $n_1$, $n_2$ and $n_3$ are selected positive integers, the method comprising the steps of:

providing an array R of $n_1$ predetermined input signals that are received at a first input terminal of the difference module;

receiving an array Z of $n_1$ signals at a second input terminal of the difference module;

forming and issuing a difference array $E=R-Z$ of $n_1$ signals at an output terminal of the difference module;

causing the controller module to receive the array E at an input terminal thereof and, in response thereto, to issue an array $U=CE$ of $n_3$ intermediate output signals at an output terminal thereof;

causing the plant module to receive the array U at an input terminal thereof and, in response thereto, to form and issue an array $Y=PU$ of $n_2$ output signals at an output terminal thereof;

causing the sensor module to receive the array Y at an input terminal thereof and, in response thereto, to form and issue the array $Z=HY$ of $n_1$ signals at an output terminal thereof;

providing a control system signal analyzer, connected to the difference module of the feedback loop, that injects the array of signals R, measures the array of signals Y and the array of signals R, and determines the entries of the matrix W of dimensions $n_2 \times n_1$ by solving the matrix identity $Y=WR$;

measuring the array Y of $n_2$ signals received in response to provision of the array R of $n_1$ signals;

determining the entries of the matrix W;

forming a quasi-inverse matrix $(I-HW)^\dagger$ of the matrix $(I-HW)$ and determining the matrix HPC, having dimensions $n_1 \times n_1$, by the relation $HPC=(I-HW)^\dagger HW = HW(I-HW)^\dagger$;

forming a quasi-inverse $C^\dagger$ of the matrix C; and providing a multivariable work station, including a digital computer, a digital signal processor, a mathematics module and an interface between the control system signal analyzer and the remainder of the multivariable work station, connected to the feedback loop, that receives and temporarily stores the arrays of signals R and Y as measured by the control system signal analyzer, and that receives the entries of the matrices W, $(I-HW)^\dagger$ and $C^\dagger$ and determines the entries of the matrix HP or HPC or PCH.

43. A method for determining open-loop parameters for a Second Configuration, multiple-input, multiple output, closed-loop control system, having a difference module, a controller module, a sum module and a plant module arranged in that order in a feedback loop that operates in its linear operating region, the controller module having controller dynamics represented by a matrix C of dimensions $n_2 \times n_1$ and the plant module having physical system dynamics represented by a matrix P of dimensions $n_1 \times n_2$, where $n_1$ and $n_2$ are selected positive integers, the method comprising the steps of:

provㅇiding a first array $R_1$ of $n_1$ predetermined input signals that are received at a first input terminal of the difference module;

receiving an array $Y_2$ of $n_1$ signals at a second input terminal of the difference module;

forming and issuing a difference array $E_1 = R_1 - Y_2$ of $n_1$ signals at an output terminal of the difference module;

causing the controller module to receive the array $E_1$ at an input terminal thereof and, in reponse thereto, to issue an array $Y_1 = CE_1$ of $n_2$ intermediate output signals at an output terminal thereof;

providing a second array $R_2$ of $n_2$ predetermined input signals that are received at a first input terminal of the sum module;

receiving the array $Y_1$ of $n_2$ signals at a second input terminal of the sum module;

forming and issuing a sum array $E_2 = R_2 + Y_1$ of $n_2$ signals at an output terminal of the sum module;

causing the plant module to receive the array $E_2$ at an input terminal thereof and, in response thereto, to form and issue an array $Y_2 = PE_2$ of $n_1$ output signals at an output terminal thereof;

providing a control system signal analyzer, connected to the difference module of the feedback loop, that injects the first and second arrays of signals $R_1$ and $R_2$, measures the arrays of signals $Y_1$ and $Y_2$ received in response thereto, and determines the entries of at least one of the matrices $T = T_1, T_2, T_3$ and $T_4$ by solving the matrix identity $$\begin{bmatrix} Y_1 \\ Y_2 \end{bmatrix} = \begin{bmatrix} T_1 & T_2 \\ T_3 & T_4 \end{bmatrix} \begin{bmatrix} R_1 \\ R_2 \end{bmatrix};$$

forming at least one of the quasi-inverse matrices $T_1^\dagger$, $(I+T_2)^\dagger$, $(I-T_3)^\dagger$, $(I-T_4C)^\dagger$ and $(I-CT_4)^\dagger$; and providing a multivariable work station, including a digital computer, a digital signal processor, a mathematics module and an interface between the control system signal analyzer and the remainder of the multivariable work station, connected to the feedback loop, that receives and temporarily stores the arrays of signals $R_1, R_2, Y_1$ and $Y_2$ as measured by the control system signal analyzer, and that receives the entries of at least one of the matrices C and $C^\dagger$ and the entries of at least one of the matrices $T_1^\dagger$, $(I+T_2)^\dagger$, $(I-T_3)^\dagger$, $(I-T_4C)^\dagger$ and $(I-CT_4)^\dagger$ and determines the entries of the matrix P or PC or CP.

44. A method for determining open-loop parameters for a Second Configuration, multiple-input, multiple output, closed-loop control system, having a difference module, a controller module, a sum module and a plant module arranged in that order in a feedback loop that operates in its linear operating region, the controller module having controller dynamics represented by a matrix C of dimensions $n_2 \times n_1$ and the plant module having physical system dynamics represented by a matrix P of dimensions $n_1 \times n_2$, where $n_1$ and $n_2$ are selected positive integers, the method comprising the steps of:

providing a first array $R_1$ of $n_1$ predetermined input signals that are received at a first input terminal of the difference module;

receiving an array $Y_2$ of $n_1$ signals at a second input terminal of the difference module;

forming and issuing a difference array $E_1 = R_1 - Y_2$ of $n_1$ signals at an output terminal of the difference module;

causing the controller module to receive the array $E_l$ at an input terminal thereof and, in response thereto, to issue an array $Y_1 = CE_1$ of $n_2$ intermediate output signals at an output terminal thereof;

providing a second array $R_2$ of $n_2$ predetermined input signals that are received at a first input terminal of the sum module;

receiving the array $Y_1$ of $n_2$ signals at a second input terminal of the sum module;

forming and issuing a sum array $E_2 = R_2 + Y_1$ of $n_2$ signals at an output terminal of the sum module;

causing the plant module to receive the array $E_2$ at an input terminal thereof and, in response thereto, to form and issue an array $Y_2 = PE_2$ of $n_1$ output signals at an output terminal thereof;

providing a control system signal analyzer, connected to the difference module of the feedback loop, that injects the first and second arrays of signals $R_1$ and $R_2$, measures the arrays of signals $E_1$ and $E_2$ received in response thereto, and determines the entries of at least one of the matrices $S = S_1, S_2, S_3$ and $S_4$ by solving the matrix identity $$\begin{bmatrix} E_1 \\ E_2 \end{bmatrix} = \begin{bmatrix} S_1 & S_2 \\ S_3 & S_4 \end{bmatrix} \begin{bmatrix} R_1 \\ R_2 \end{bmatrix}$$

forming at least one of the quasi-inverse matrices $S_1^\dagger$, $(I+S_2C)^\dagger$, $(I+CS_2)^\dagger$, $S_3^\dagger$ and $S_4^\dagger$; and providing a multivariable work station, including a digital a digital signal processor, a mathematics module and an interface between the control system signal analyzer and the remainder of the multivariable work station, connected to the feedback loop, that receives and temporarily stores the arrays of signals $R_1, R_2, E_1$ and $E_2$ as measured by the control system signal analyzer, and that receives the entries of at least one of the matrices C and $C^\dagger$ and the entries of at least one of the matrices $S_1^\dagger$, $(I+CS_2)^\dagger$, $(I+S_2C)^\dagger$, $S_3^\dagger$ and $S_4^\dagger$ and determines the entries of the matrix P or C or CP or PC.

45. A method for determining open-loop parameters for a Third Configuration, multiple-input, multiple output, closed-loop control system, having a difference module, a controller module, a first sum module, a plant module, a second sum module and a sensor module arranged in that order in a feedback loop that operates in its linear operating region, the controller module having controller dynamics represented by a matrix C of dimensions $n_2 \times n_1$, the plant module having physical system dynamics represented by a matrix P of dimensions $n_3 \times n_2$, and the sensor module having sensor dynamics represented by a matrix H of dimensions $n_1 \times n_3$, where $n_1$, $n_2$ and $n_3$ are selected positive integers, the method comprising the steps of:

providing a first array $R_1$ of $n_1$ predetermined input signals that are received at a first input terminal of the difference module;

receiving an array $Y_3$ of $n_1$ signals at a second input terminal of the difference module;

forming and issuing a difference array $E_1 = R_1 - Y_3$ of $n_1$ signals at an output terminal of the difference module;

causing the controller module to receive the array $E_1$ at an input terminal thereof and, in response thereto, to issue an array $Y_1 = CE_1$ of $n_2$ intermediate output signals at an output terminal thereof;

providing a second array $R_2$ of $n_2$ predetermined input signals that are received at a first input terminal of the first sum module;

receiving the array $Y_1$ of $n_2$ signals at a second input terminal of the first sum module;

forming and issuing a sum array $E_2 = R_2 + Y_1$ of $n_2$ signals at an output terminal of the first sum module;

causing the plant module to receive the array $E_2$ at an input terminal thereof and, in response thereto, to form and issue an array $Y_2 = PE_2$ of $n_3$ output signals at an output terminal thereof;

providing a third array $R_3$ of $n_3$ predetermined input signals that are received at a first input terminal of the second sum module;

receiving the array $Y_2$ of $n_3$ signals at a second input terminal of the second sum module;

forming and issuing a sum array $E_3 = R_3 + Y_2$ of $n_3$ signals at an output terminal of the second sum module;

causing the sensor module to receive the array $E_3$ at an input terminal thereof and, in response thereto, to form and issue an array $Y_3 = HE_3$ of $n_1$ output signals at an output terminal thereof;

providing a control system signal analyzer, connected to the difference module, the first sum module and the second sum module of the feedback loop, that injects the first, second and third arrays of signals $R_1$, $R_2$ and $R_3$, measures the arrays of signals $Y_1$, $Y_2$ and $Y_3$ received in response thereto, and determines the entries of at least one of the matrices $T = T_{11}$, $T_{12}$, $T_{13}$, $T_{21}$, $T_{22}$, $T_{23}$, $T_{31}$, $T_{32}$ and $T_{33}$ by solving the matrix identity forming at least one of the quasi-inverse matrices $T_{11}^{\dagger}$, $(I+T_{12})^{\dagger}$, $(I-T_{31})^{\dagger}$, $(I-T_{32}C)^{\dagger}$ and $(I-CT_{32})^{\dagger}$; and providing a multivariable work station, including a digital computer, a digital signal processor, a mathematics module and an interface between the control system signal analyzer and the remainder of the multivariable work station, connected to the feedback loop, that receives and temporarily stores the arrays of signals $R_1$, $R_2$, $R_3$, $Y_1$, $Y_2$ and $Y_3$ as measured by the control system signal analyzer, that receives the entries of at least one of the matrices C and $C^{\dagger}$, that receives the entries of at least one of the matrices $T_{11}^{\dagger}$, $(I+T_{12})^{\dagger}$, $(I-I_{31})^{\dagger}$, $(I-T_{32}C)^{\dagger}$, and $(I-CT_{32})^{\dagger}$ and determines the entries of the matrix HP or HPC or CHP or PCH.

46. A method for determining open-loop parameters for a Third Configuration, multiple-input, multiple output, closed-loop control system, having a difference module, a controller module, a first sum module, a plant module, a second sum module and a sensor module arranged in that order in a feedback loop that operates in its linear operating region, the controller module having controller dynamics represented by a matrix C of dimensions $n_2 \times n_1$, the plant module having physical system dynamics represented by a matrix P of dimensions $n_3 \times n_2$, and the sensor module having sensor dynamics represented by a matrix H of dimensions $n_1 \times n_3$, where $n_1$, $n_2$ and $n_3$ are selected positive integers, the method comprising the steps of:

providing a first array $R_1$ of $n_1$ predetermined input signals that are received at a first input terminal of the difference module;

receiving an array $Y_3$ of $n_1$ signals at a second input terminal of the difference module;

forming and issuing a difference array $E_1 = R_1 - Y_3$ of $n_l$ signals at an output terminal of the difference module;

causing the controller module to receive the array $E_l$ at an input terminal thereof and, in response thereto, to issue an array $Y_1 = CE_1$ of $n_2$ intermediate output signals at an output terminal thereof;

providing a second array $R_2$ of $n_2$ predetermined input signals that are received at a first input terminal of the first sum module;

receiving the array $Y_1$ of $n_2$ signals at a second input terminal of the first sum module;

forming and issuing a sum array $E_2 = R_2 + Y_1$ of $n_2$ signals at an output terminal of the first sum module;

causing the plant module to receive the array $E_2$ at an input terminal thereof and, in response thereto, to form and issue an array $Y_2 = PE_2$ of $n_3$ output signals at an output terminal thereof;

providing a third array $R_3$ of $n_3$ predetermined input signals that are received at a first input terminal of the second sum module;

receiving the array $Y_2$ of $n_3$ signals at a second input terminal of the second sum module;

forming and issuing a sum array $E_3 = R_3 + Y_2$ of $n_3$ signals at an output terminal of the second sum module;

causing the sensor module to receive the array $E_3$ at an input terminal thereof and, in response thereto, to form and issue an array $Y_3 = HE_3$ of $n_1$ output signals at an output terminal thereof;

providing a control system signal analyzer, connected to the difference module, the first sum module and the second sum module of the feedback loop, that injects the first, second and third arrays of signals $R_1$, $R_2$ and $R_3$, measures the arrays of signals $Y_1$, $Y_2$ and $Y_3$ received in response thereto, and determines the entries of at least one of the matrices $T = T_{11}$, $T_{12}$, $T_{13}$, $T_{21}$, $T_{22}$, $T_{23}$, $T_{31}$, $T_{32}$ and $T_{33}$ by solving the matrix identity forming at least one of the quasi-inverse matrices $T_{13}^{\dagger}$, $(I-HT_{21})^{\dagger}$, $(I-T_{21}H)^{\dagger}$, $(I-T_{22}CH)^{\dagger}$, $(I-CHT_{22})^{\dagger}$, $(I+T_{23})^{\dagger}$ and $T_{33}^{\dagger}$; and providing a multivariable work station, including a digital computer, a digital signal processor, a mathematics module and an interface between the control system signal analyzer and the remainder of the multivariable work station, connected to the feedback loop, that receives and temporarily stores the arrays of signals $R_1$, $R_2$, $R_3$, $Y_1$, $Y_2$ and $Y_3$ as measured by the control system signal analyzer, that receives the entries of at least one of the matrices C, C†, H, H†, CH and (CH)†, that receives the entries of at least one of the matrices $T_{13}$†, (I-$T_{21}$H)†, (I-H$T_{21}$)†, (I-$T_{22}$CH)†, (I-CH$T_{22}$)†, (I-$T_{23}$)† and $T_{33}$† and determines the entries of the matrix P or HPC or CHP or PCH or PC.

47. A method for determining open-loop parameters for a Third Configuration, multiple-input, multiple output, closed-loop control system, having a difference module, a controller module, a first sum module, a plant module, a second sum module and a sensor module arranged in that order in a feedback loop that operates in its linear operating region, the controller module having controller dynamics represented by a matrix C of dimensions $n_2 \times n_1$, the plant module having physical system dynamics represented by a matrix P of dimensions $n_3 \times n_2$, and the sensor module having sensor dynamics represented by a matrix H of dimensions $n_1 \times n_3$, where $n_1$, $n_2$ and $n_3$ are selected positive integers, the method comprising the steps of:

providing a first array $R_1$ of $n_1$ predetermined input signals that are received at a first input terminal of the difference module;

receiving an array $Y_3$ of $n_1$ signals at a second input terminal of the difference module;

forming and issuing a difference array $E_1 = R_1 - Y_3$ of $n_1$ signals at an output terminal of the difference module;

causing the controller module to receive the array $E_l$ at an input terminal thereof and, in response thereto, to issue an array $Y_1 = CE_1$ of $n_2$ intermediate output signals at an output terminal thereof;

providing a second array $R_2$ of $n_2$ predetermined input signals that are received at a first input terminal of the first sum module;

receiving the array $Y_1$ of $n_2$ signals at a second input terminal of the first sum module;

forming and issuing a sum array $E_2 = R_2 + Y_1$ of $n_2$ signals at an output terminal of the first sum module;

causing the plant module to receive the array $E_2$ at an input terminal thereof and, in response thereto, to form and issue an array $Y_2 = PE_2$ of $n_3$ output signals at an output terminal thereof;

providing a third array $R_3$ of $n_3$ predetermined input signals that are received at a first input terminal of the second sum module;

receiving the array $Y_2$ of $n_3$ signals at a second input terminal of the second sum module;

forming and issuing a sum array $E_3 = R_3 + Y_2$ of $n_3$ signals at an output terminal of the second sum module;

causing the sensor module to receive the array $E_3$ at an input terminal thereof and, in response thereto, to form and issue an array $Y_3 = HE_3$ of $n_1$ output signals at an output terminal thereof;

providing a control system signal analyzer, connected to the difference module, the first sum module and the second sum module of the feedback loop, that injects the first, second and third arrays of signals $R_1$, $R_2$ and $R_3$, measures the arrays of signals $E_1$, $E_2$ and $E_3$ received in response thereto, and determines the entries of at least one of the matrices S=$S_{11}$, $S_{12}$, $S_{13}$, $S_{21}$, $S_{22}$, $S_{23}$, $S_{31}$, $S_{32}$ and $S_{33}$ by solving the matrix identity $$\begin{bmatrix} E_1 \\ E_2 \\ E_3 \end{bmatrix} = \begin{bmatrix} S_{11} & S_{12} & S_{13} \\ S_{21} & S_{22} & S_{23} \\ S_{31} & S_{32} & S_{33} \end{bmatrix} \begin{bmatrix} R_1 \\ R_2 \\ R_3 \end{bmatrix}$$

forming at least one of the quasi-inverse matrices $S_{11}$†, $(I+CS_{12})$†, $(I+S_{12}C)$†, $S_{21}$†, and $S_{22}$†; and providing a multivariable work station, including a digital computer, a digital signal processor, a mathematics module and an interface between the control system signal analyzer and the remainder of the multivariable work station, connected to the feedback loop, that receives and temporarily stores the arrays of signals $R_1$, $R_2$, $R_3$, $Y_1$, $Y_2$ and $Y_3$ as measured by the control system signal analyzer, that receives the entries of at least one of the matrices C, C† and H, that receives the entries of at least one of the matrices $S_{11}$†, $(I+CS_{12})$† $(I+S_{12}C)$†, $S_{21}$† and $S_{22}$†, and determines the entries of the matrix HP or HPC or CHP or PCH.

48. A method for determining open-loop parameters for a Third Configuration, multiple-input, multiple output, closed-loop control system, having a difference module, a controller module, a first sum module, a plant module, a second sum module and a sensor module arranged in that order in a feedback loop that operates in its linear operating region, the controller module having controller dynamics represented by a matrix C of dimensions $n_2 \times n_1$, the plant module having physical system dynamics represented by a matrix P of dimensions $n_3 \times n_2$, and the sensor module having sensor dynamics represented by a matrix H of dimensions $n_1 \times n_3$, where $n_1$, $n_2$ and $n_3$ are selected positive integers, the method comprising the steps of:

providing a first array $R_1$ of $n_1$ predetermined input signals that are received at a first input terminal of the difference module;

receiving an array $Y_3$ of $n_1$ signals at a second input terminal of the difference module;

forming and issuing a difference array $E_1 = R_1 - Y_3$ of $n_1$ signals at an output terminal of the difference module;

causing the controller module to receive the array $E_1$ at an input terminal thereof and, in response thereto, to issue an array $Y_1 = CE_1$ of $n_2$ intermediate output signals at an output terminal thereof;

providing a second array $R_2$ of $n_2$ predetermined input signals that are received at a first input terminal of the first sum module;

receiving the array $Y_1$ of $n_2$ signals at a second input terminal of the first sum module;

forming and issuing a sum array $E_2 = R_2 + Y_1$ of $n_2$ signals at an output terminal of the first sum module;

causing the plant module to receive the array $E_2$ at an input terminal thereof and, in response thereto, to form and issue an array $Y_2 = PE_2$ of $n_3$ output signals at an output terminal thereof;

providing a third array $R_3$ of $n_3$ predetermined input signals that are received at a first input terminal of the second sum module;

receiving the array $Y_2$ of $n_3$ signals at a second input terminal of the second sum module;

forming and issuing a sum array $E_3 = R_3 + Y_2$ of $n_3$ signals at an output terminal of the second sum module;

causing the sensor module to receive the array $E_3$ at an input terminal thereof and, in response thereto, to form and issue an array $Y_3 = HE_3$ of $n_1$ output signals at an output terminal thereof;

providing a control system signal analyzer, connected to the difference module, the first sum module and the second sum module of the feedback loop, that injects the first, second and third arrays of signals $R_1$, $R_2$ and $R_3$, measures the arrays of signals $E_1$, $E_2$ and $E_3$ received in response thereto, and determines the entries of at least one of the matrices $S = S_{11}$, $S_{12}$, $S_{13}$, $S_{21}$, $S_{22}$, $S_{23}$, $S_{31}$, $S_{32}$ and $S_{33}$ by solving the matrix identity $$\begin{bmatrix} E_1 \\ E_2 \\ E_3 \end{bmatrix} = \begin{bmatrix} S_{11} & S_{12} & S_{13} \\ S_{21} & S_{22} & S_{23} \\ S_{31} & S_{32} & S_{33} \end{bmatrix} \begin{bmatrix} R_1 \\ R_2 \\ R_3 \end{bmatrix}$$

forming at least one of the quasi-inverse matrices $S_{13}\dagger$, $S_{23}\dagger$, $(I-S_{31}H)\dagger$, $(I-HS_{31})\dagger$, $(I-S_{32}CH)\dagger$, $(I-CHS_{32})\dagger$ and $S_{33}\dagger$; and providing a multivariable work station, including a digital computer, a digital signal processor, a mathematics module and an interface between the control system signal analyzer and the remainder of the multivariable work station, connected to the feedback loop, that receives and temporarily stores the arrays of signals $R_1$, $R_2$, $R_3$, $Y_1$, $Y_2$ and $Y_3$ as measured by the control system signal analyzer, that receives the entries of at least one of the matrices $H\dagger$, $CH$ and $(CH)\dagger$, that receives the entries of at least one of the matrices $S_{13}\dagger$, $S_{23}\dagger$, $(I-HS_{31})\dagger$, $(I-S_{31}H)\dagger$, $(I-S_{32}CH)\dagger$, $(I-CHS_{32})\dagger$ and $S_{33}\dagger$ and determines the entries of the matrix $P$ or $HPC$ or $CHP$ or $PCH$ or $PC$.

* * * * *